United States Patent
Yang et al.

(10) Patent No.: US 12,250,566 B2
(45) Date of Patent: Mar. 11, 2025

(54) METHOD FOR PUCCH TRANSMISSION, METHOD FOR INFORMATION CONFIGURATION, AND DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 354 days.

(21) Appl. No.: 17/569,748

(22) Filed: Jan. 6, 2022

(65) Prior Publication Data
US 2022/0132327 A1   Apr. 28, 2022

Related U.S. Application Data

(63) Continuation of application No. PCT/CN2020/102327, filed on Jul. 16, 2020.

(30) Foreign Application Priority Data

Jul. 19, 2019 (CN) .......................... 201910657447.9

(51) Int. Cl.
*H04W 16/28* (2009.01)
*H04W 72/02* (2009.01)
(Continued)

(52) U.S. Cl.
CPC ............ *H04W 16/28* (2013.01); *H04W 72/02* (2013.01); *H04W 72/046* (2013.01);
(Continued)

(58) Field of Classification Search
CPC ... H04W 16/28; H04W 72/02; H04W 72/046; H04W 72/0473; H04W 72/23;
(Continued)

(56) References Cited

U.S. PATENT DOCUMENTS

| 2018/0213524 A1 | 7/2018 | Xiao et al. |
| 2019/0190582 A1 | 6/2019 | Guo et al. |

(Continued)

FOREIGN PATENT DOCUMENTS

| CN | 107113820 A | 8/2017 |
| CN | 108882314 A | 11/2018 |

(Continued)

OTHER PUBLICATIONS

ZTE, "PUSCH spatiel relation and power control after BFR," 3GPP TSG RAN WG1 Meeting #96bis, R1-1904030, Xi'an, China, Apr. 8-12, 2019 (3 pages).

(Continued)

*Primary Examiner* — Candal Elpenord
(74) *Attorney, Agent, or Firm* — Price Heneveld LLP

(57) ABSTRACT

This disclosure provides a method for PUCCH transmission, a method for information configuration, and a device. The method for PUCCH transmission includes: in a case that a first preset condition is met, determining a target parameter used for sending a PUCCH on a target PUCCH resource, where the target PUCCH resource has at least one activation parameter, the target parameter is one of the at least one activation parameter, and the activation parameter includes at least one of activated spatial relation information and an activated power control parameter; and sending a PUCCH on the target PUCCH resource by using the target parameter.

18 Claims, 7 Drawing Sheets

(51) Int. Cl.
| | | |
|---|---|---|
| *H04W 72/04* | (2023.01) | |
| *H04W 72/044* | (2023.01) | |
| *H04W 72/23* | (2023.01) | |
| *H04W 80/02* | (2009.01) | |

(52) U.S. Cl.
CPC ....... *H04W 72/0473* (2013.01); *H04W 72/23* (2023.01); *H04W 80/02* (2013.01)

(58) Field of Classification Search
CPC ... H04W 72/21; H04W 80/02; H04W 52/242; H04W 52/325; H04L 1/1861; H04L 1/1812; H04L 5/001; H04L 5/0023; H04L 5/0094; H04L 5/0055; H04B 7/024
USPC .................................................. 370/329–330
See application file for complete search history.

(56) References Cited

U.S. PATENT DOCUMENTS

| | | | |
|---|---|---|---|
| 2019/0261356 A1 | 8/2019 | Myung et al. | |
| 2019/0349867 A1* | 11/2019 | MolavianJazi | ....... H04W 52/40 |
| 2019/0349964 A1* | 11/2019 | Liou | .................... H04W 76/27 |
| 2020/0068548 A1 | 2/2020 | Guan et al. | |
| 2020/0260300 A1* | 8/2020 | Cirik | ................... H04W 72/046 |
| 2020/0305168 A1* | 9/2020 | Liou | .................... H04W 76/11 |
| 2020/0314860 A1* | 10/2020 | Zhou | .................... H04W 72/23 |
| 2021/0014026 A1* | 1/2021 | Papasakellariou | .... H04L 1/1861 |
| 2021/0136768 A1 | 5/2021 | Kang et al. | |
| 2022/0286972 A1* | 9/2022 | Miao | .................... H04W 72/23 |
| 2022/0377721 A1 | 11/2022 | Guan et al. | |

FOREIGN PATENT DOCUMENTS

| | | |
|---|---|---|
| CN | 109803427 A | 5/2019 |
| WO | 2018117921 A1 | 6/2018 |
| WO | 2018128365 A1 | 7/2018 |
| WO | 2019096129 A1 | 5/2019 |
| WO | 2019139436 A1 | 7/2019 |

OTHER PUBLICATIONS

LG Electronics, "Feature lead summary#3 of Enhancements on Multi-beam Operations", 3GPP TSG RAN WG1 Meeting #97, R1-1907860, Reno, USA, May 13-17, 2019.

Ericsson, "Maintenance for beam management", 3GPP TSG-RAN WG1 Meeting #94bis, Tdoc R1-1811187, Chengdu, China, Oct. 8-12, 2018.

"3rd Generation Partnership Project; Technical Specification Group Radio Access Network; NR-' Physical layer procedures for control (Release 15)", 3GPP TS 38.213 V15.6.0 (Jun. 2019), Valbonne, France.

Nokia et al., "Enhancements on Multi-beam Operation", 3GPP TSG RAN WG1 #96bis Meeting, R1-1905065, Xi'an, China, Apr. 8-12, 2019.

ZTE, "Details of latency and overhead reduction for beam management", 3GPP TSG RAN WG1 #97, R1-1906245, Reno, USA, May 13-17, 2019.

\* cited by examiner

METHOD FOR PUCCH TRANSMISSION, METHOD FOR INFORMATION CONFIGURATION, AND DEVICE

CROSS-REFERENCE TO RELATED APPLICATIONS

This disclosure is a continuation of PCT Application No. PCT/CN2020/102327 filed on Jul. 16, 2020, which claims priority to Chinese Patent Application No. 201910657447.9, filed on Jul. 19, 2019 and entitled "METHOD FOR PUCCH TRANSMISSION, METHOD FOR INFORMATION CONFIGURATION, AND DEVICE", which are incorporated herein by reference in their entireties.

TECHNICAL FIELD

This disclosure relates to the field of communications technologies, and in particular, to a method for PUCCH transmission, a method for information configuration, and a device.

BACKGROUND

In a 5th generation (5G) mobile communications system, after receiving a physical downlink shared channel (PDSCH), a terminal device (UE) needs to feed back hybrid automatic repeat request ACK (HARQ-ACK) information to a network device by using a physical uplink control channel (PUCCH) resource configured by the network device. In addition, before the HARQ-ACK information is fed back by using the PUCCH resource, parameters related to the PUCCH resource, such as spatial relation information (used to indicate PUCCH beam information) and a power control parameter for PUCCH, also need to be determined, and the related parameters are used for feeding back the HARQ-ACK on the PUCCH resource.

In conventional technologies, one PUCCH resource is not allowed to have a plurality of activation parameters such as spatial relation information. Even if one PUCCH resource is allowed to have at least one activation parameter, it is still unclear which parameter is to be used for sending a PUCCH on the PUCCH resource.

SUMMARY

According to a first aspect, a method for PUCCH transmission is provided, applied to a terminal device, where the method includes:
  in a case that a first preset condition is met, determining a target parameter used for sending a PUCCH on a target PUCCH resource, where the target PUCCH resource has at least one activation parameter, the target parameter is one of the at least one activation parameter, and the activation parameter includes at least one of activated spatial relation information and an activated power control parameter; and
  sending a PUCCH on the target PUCCH resource by using the target parameter.

According to a second aspect, a method for information configuration is provided, applied to a network device, where the method includes:
  sending first information to a terminal device; where
  the first information is used for the terminal device to determine at least one activation parameter of a target PUCCH resource; or the first information is used for the terminal device to determine an activation parameter of at least one PUCCH resource group to which a target PUCCH resource belongs, where different PUCCH resource groups to which the target PUCCH resource belongs have different activation parameters, and the activation parameter includes at least one of activated spatial relation information and an activated power control parameter.

According to a third aspect, a terminal device is provided, where the terminal device includes:
  a first determining module, configured to: in a case that a first preset condition is met, determine a target parameter used for sending a PUCCH on a target PUCCH resource, where the target PUCCH resource has at least one activation parameter, the target parameter is one of the at least one activation parameter, and the activation parameter includes at least one of activated spatial relation information and an activated power control parameter; and
  a PUCCH sending module, configured to send a PUCCH on the target PUCCH resource by using the target parameter.

According to a fourth aspect, a network device is provided, where the network device includes:
  a first sending module, configured to send first information to a terminal device, where
  the first information is used for the terminal device to determine at least one activation parameter of a target PUCCH resource; or the first information is used for the terminal device to determine an activation parameter of at least one PUCCH resource group to which a target PUCCH resource belongs, where different PUCCH resource groups to which the target PUCCH resource belongs have different activation parameters, and the activation parameter includes at least one of activated spatial relation information and an activated power control parameter.

According to a fifth aspect, a terminal device is provided, where the terminal device includes a memory, a processor, and a wireless communication program stored in the memory and capable of running on the processor, and when the wireless communication program is executed by the processor, the steps of the method according to the first aspect are implemented.

According to a sixth aspect, a network device is provided, where the network device includes a memory, a processor, and a wireless communication program stored in the memory and capable of running on the processor, and when the wireless communication program is executed by the processor, the steps of the method according to the second aspect are implemented.

According to a seventh aspect, a computer-readable storage medium is provided, where a wireless communication program is stored in the computer-readable storage medium, and when the wireless communication program is executed by a processor, the steps of the method according to the first aspect or the second aspect are implemented.

According to an eighth aspect, a computer program product is provided. When a computer runs an instruction of the computer program product, the computer executes the foregoing method according to the first aspect or the second aspect.

BRIEF DESCRIPTION OF DRAWINGS

Features, advantages, and technical effects of exemplary embodiments of this disclosure are described below with reference to the accompanying drawings.

DETAILED DESCRIPTION OF EMBODIMENTS

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

It should be understood that the technical solutions in the embodiments of this disclosure can be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS) or a worldwide interoperability for microwave access (WiMAX) communications system, a 5G system, or a new radio (NR) system.

UE is also referred to as a mobile terminal, a mobile terminal device, and the like, and may communicate with at least one core network through a radio access network (RAN). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for configuring information. The network device may be a base station, and the base station may be a base station (Base Transceiver Station, BTS) in GSM or CDMA, may be a NodeB in WCDMA, or may be an evolved NodeB (eNB or e-NodeB) in LTE, a 5G NodeB (gNB), or a network-side device in a subsequent evolved communications system. However, the terms used do not constitute any limitation on the protection scope of this disclosure.

It should be noted that, during description of specific embodiments, sequence numbers of processes do not mean execution sequences, and the execution sequences of the processes should be determined according to functions and internal logic of the processes, and should not be construed as any limitation on the implementation processes in the embodiments of this disclosure.

Figure 1:
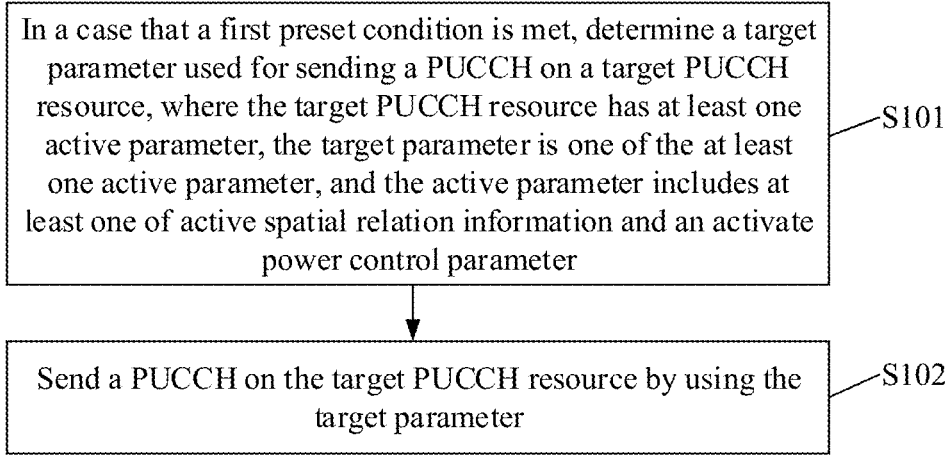
FIG. 1 is a first schematic flowchart of a method for PUCCH transmission according to an embodiment of this disclosure.

As shown in FIG. 1, a method for PUCCH transmission according to an embodiment of this disclosure can be applied to a terminal device, and the method may include the following steps.

Step 101: In a case that a first preset condition is met, determine a target parameter used for sending a PUCCH on a target PUCCH resource, where the target PUCCH resource has at least one activation parameter, and the target parameter is one of the at least one activation parameter.

The target PUCCH resource may be any one PUCCH resource configured by the network device for the terminal device. The activation parameter includes but is not limited to at least one of activated spatial relation information and an activate power control parameter. The power control parameter may include, but is not limited to, a pathloss reference signal (pathloss RS).

The target PUCCH resource may have at least one piece of activated spatial relation information, such as spatial relation 1 and spatial relation 2; and/or, the target PUCCH resource may have at least one activated power control parameter, such as pathloss reference signals pathloss RS 1 and pathloss RS 2. When a PUCCH needs to be transmitted on the target PUCCH resource, one of the at least one piece of activated spatial relation information needs to be selected as target spatial relation information for sending the PUCCH on the target PUCCH resource, and one of the at least one activated power control parameter needs to be selected as a target power control parameter for sending the PUCCH on the target PUCCH resource.

The first preset condition includes but is not limited to one of the following three conditions:

Condition 1: First downlink control information (DCI) has been received from one transmission and reception point (TRP), where the first DCI is used to indicate that a PUCCH is to be transmitted on the target PUCCH resource.

Condition 2: A plurality of pieces of DCI have been received from a plurality of TRPs, where the plurality of pieces of DCI are used to indicate that a PUCCH is to be transmitted on the target PUCCH resource.

Condition 3: A time point for sending a PUCCH by using the target PUCCH resource has arrived, where the target PUCCH resource is a periodic resource or a semi-persistent resource.

It can be understood that the foregoing three first preset conditions respectively correspond to three different application scenarios.

In the foregoing three different application scenarios, the determining a target parameter used for sending a PUCCH on a target PUCCH resource in step 101 includes:

selecting one activation parameter from the at least one activation parameter as the target parameter used for sending a PUCCH on the target PUCCH resource.

For example, one piece of spatial relation information is selected from the at least one piece of activated spatial relation information as the target spatial relation information for sending a PUCCH on the target PUCCH resource; and/or one power control parameter is selected from the at least one activated power control parameter as the target power control parameter for sending a PUCCH on the target PUCCH resource. The following uses several examples for description.

Example 1

The selecting one activation parameter from the at least one activation parameter as the target parameter used for sending a PUCCH on the target PUCCH resource may include:

in a case that PUCCH resources are not divided into groups, determining a first activation parameter of the at least one activation parameter as the target parameter used for sending a PUCCH on the target PUCCH resource.

That is, when the PUCCH resources are not divided into groups, one default activation parameter in the at least one activation parameter of the target PUCCH resource is determined as the target parameter used for sending a PUCCH on the target PUCCH resource.

The first activation parameter is one of the following activation parameters:

(1) Activation parameter in correspondence with a first specified TRP.

That is, in a case that there is a correspondence between the at least one activation parameter of the target PUCCH resource and TRPs, the activation parameter corresponding to the first specified TRP is used as the first activation parameter.

In the first application scenario in which the first preset condition includes that first DCI has been received from one TRP, the first specified TRP is a TRP that sends the first DCI.

For example, it is assumed that the target PUCCH resource has two pieces of activated spatial relation information: spatial relation 1 and spatial relation 2, where spatial relation 1 corresponds to a TRP1, and spatial relation 2 corresponds to a TRP2. In this case, when the first DCI used to indicate that a PUCCH is to be transmitted on the target PUCCH resource is received from the TRP1, the TRP1 may be used as the first specified TRP. Correspondingly, spatial relation 1 corresponding to the TRP1 is used as the first activation parameter.

In the second application scenario in which the first preset condition includes that a plurality of pieces of DCI have been received from a plurality of TRPs, the first specified TRP is a TRP with a first preset identifier in the plurality of TRPs. The first preset identifier may be an identifier with a smallest index value, an identifier with a largest index value, an identifier with a preset index value, and so on.

For example, it is assumed that the target PUCCH resource has two pieces of activated spatial relation information: spatial relation 1 and spatial relation 2, where spatial relation 1 corresponds to a TRP1, and spatial relation 2 corresponds to a TRP2. In this case, when two pieces of DCI are received from the TRP1 and the TRP2, a TRP (TRP1) with the smallest index in the TRP1 and the TRP2 may be determined as the first specified TRP. Correspondingly, spatial relation 1 corresponding to the TRP1 is used as the first activation parameter.

In the third application scenario in which the first preset condition includes that a time point for sending a PUCCH by using the target PUCCH resource has arrived and that the target PUCCH resource is a periodic resource or a semi-persistent resource, the first specified TRP may be a TRP corresponding to a most recent transmission from/to the terminal device. The most recent transmission includes one of any most recent transmission, any most recent downlink transmission, any most recent uplink transmission, a most recent specified channel transmission, and a most recent specified signal transmission.

Any most recent transmission is one transmission closest to a current time point in all transmissions (of all channels and signals) that have occurred, and this transmission may be of any type. Any most recent downlink transmission is one downlink transmission closest to the current time point in all downlink transmissions (of all downlink channels and signals) that have occurred, and this downlink transmission may be of any type. Any most recent uplink transmission is one uplink transmission closest to the current time point in all uplink transmissions (of all uplink channels and signals) that have occurred, and this uplink transmission may be of any type. The most recent specified channel refers to a channel transmission (for example, PDCCH) of a specified type closest to the current time point in all channel transmissions that have occurred. The most recent specified signal is a signal transmission of a specified type closest to the current time point in all signal transmissions that have occurred.

For example, it is assumed that the target PUCCH resource has two pieces of activated spatial relation information: spatial relation 1 and spatial relation 2, where spatial relation 1 corresponds to a TRP1, and spatial relation 2 corresponds to a TRP2. The most recent transmission is a most recent PDCCH. In this case, when the time point for sending the PUCCH by using the target PUCCH resource has arrived, if the TRP corresponding to the most recent PDCCH is the TRP2, the TRP2 may be determined as the first specified TRP. Correspondingly, spatial relation 2 corresponding to the TRP2 is used as the first activation parameter.

It should be noted that, in this embodiment of this disclosure, one TRP may be identified by at least one of the following information:

a control resource set or control resource set group;

an index value (ID), which is an explicit TRP identification manner;

a transmission configuration indicator (TCI) state, TCI state list, or TCI state pool;

quasi co-location (QCL) information or QCL group information;

spatial relation information or spatial relation group information;

a PDCCH scrambling ID or PDCCH scrambling ID group;

a PDSCH scrambling ID or PDSCH scrambling ID group;

a PDCCH configuration information element;

a PDSCH configuration information element; and a reference signal (RS) resource or an RS resource set.

(2) Activation parameter in correspondence with a first specified object, where the first specified object includes one of a specified resource, a specified channel, and a specified signal, and a value of a first preset parameter of the first specified object meets a second preset condition.

That is, in a case that there is a correspondence between the at least one activation parameter of the target PUCCH resource and specified objects, the activation parameter corresponding to the first specified object is used as the first activation parameter.

In the first application scenario in which the first preset condition includes that first DCI has been received from one TRP, the first specified object may be a specified object of a TRP that sends the first DCI, for example, a specified channel, specified signal, or control resource set (CORESET) group of the TRP that sends the first DCI.

For example, it is assumed that the target PUCCH resource has two pieces of activated spatial relation information: spatial relation 1 and spatial relation 2, where spatial relation 1 corresponds to a CORESET group 1, and spatial relation 2 corresponds to a CORESET group 2. In this case, when the first DCI is received from a TRP1, and a control resource set group of the TRP1 is the CORESET group 1, the CORESET group 1 may be used as the first specified object. Correspondingly, spatial relation 1 corresponding to the CORESET group 1 is used as the first activation parameter.

In the second application scenario in which the first preset condition includes that a plurality of pieces of DCI have been received from a plurality of TRPs, the first specified object is a control resource set group whose group identifier meets the second preset condition in a plurality of control resource set groups in which the plurality of pieces of DCI are located.

The second preset condition may include, but is not limited to, at least one of a group identifier being the smallest, a group identifier being the largest, and a group identifier being a preset value.

For example, it is assumed that the target PUCCH resource has two pieces of activated spatial relation information: spatial relation 1 and spatial relation 2, where spatial relation 1 corresponds to a CORESET group 1, and spatial relation 2 corresponds to a CORESET group 2. In this case, when two pieces of DCI are received from a TRP1 and a TRP2, and a control resource set group in which one piece of DCI is located is the CORESET group 1 and a control resource set group in which the other piece of DCI is the CORESET group 2, the CORESET group 1 with the smallest index value in the CORESET group 1 and the CORESET group 2 is determined as the first specified object. Correspondingly, spatial relation 1 corresponding to the CORESET group 1 is used as the first activation parameter.

In the third application scenario in which the first preset condition includes that a time point for sending a PUCCH by using the target PUCCH resource has arrived and that the target PUCCH resource is a periodic resource or a semi-persistent resource, the first specified object may be a control resource set group corresponding to a most recent transmission from/to the terminal device. The most recent transmission includes one of any most recent transmission, any most recent downlink transmission, any most recent uplink transmission, a most recent specified channel transmission, and a most recent specified signal transmission.

For example, it is assumed that the target PUCCH resource has two pieces of activated spatial relation information: spatial relation 1 and spatial relation 2, where spatial relation 1 corresponds to a CORESET group 1, and spatial relation 2 corresponds to a CORESET group 2. The most recent transmission is a most recent PDCCH. In this case, when the time point for sending the PUCCH by using the target PUCCH resource has arrived, if a control resource set group corresponding to the most recent PDCCH is the CORESET group 2, the CORESET group 2 may be determined as the first specified object. Correspondingly, spatial relation 2 corresponding to the CORESET group 2 is used as the first activation parameter.

(3) Activation parameter whose second preset parameter with a value meeting a third preset condition.

The second preset parameter includes an RS, and the value of the second preset parameter includes at least one of a type and an index value of the reference signal; or the second preset parameter includes a source reference signal (source RS), and the second preset parameter includes at least one of a type and an index value of the source reference signal.

For example, it is assumed that the target PUCCH resource has two pieces of activated spatial relation information: spatial relation 1 and spatial relation 2, where a reference signal of spatial relation 1 is synchronization signal block (SSB) 1, and a reference signal of spatial relation 2 is SSB 2. In this case, spatial relation information corresponding to a reference signal with a smallest index value in SSB 1 and SSB 2 may be determined as the first activation parameter, that is, spatial relation 1 corresponding to SSB 1 is determined as the first activation parameter.

For another example, it is assumed that the target PUCCH resource has two pieces of activated spatial relation information: spatial relation 1 and spatial relation 2, where a reference signal of spatial relation 1 is SSB 1, and a reference signal of spatial relation 2 is channel state information-reference signal (CSI-RS) 2. In this case, spatial relation information corresponding to a reference signal with a type being CSI-RS and with a largest index value may be determined as the first activation parameter, that is, spatial relation 2 corresponding to CSI-RS 2 is determined as the first activation parameter.

Example 2

The selecting one activation parameter from the at least one activation parameter as the target parameter used for sending a PUCCH on the target PUCCH resource may include:

in a case that PUCCH resources are divided into groups, determining a second activation parameter of the at least one activation parameter as the target parameter used for sending a PUCCH on the target PUCCH resource, where the second activation parameter is an activation parameter of a specified PUCCH resource group, and the specified PUCCH resource group includes the target PUCCH resource.

That is, in a case that the PUCCH resources are divided into groups, an activation parameter of a specified PUCCH resource group in the at least one PUCCH resource group to which the target PUCCH resource belongs is determined as the target parameter used for sending a PUCCH on the target PUCCH resource.

The specified PUCCH resource group may be one of the following PUCCH resource groups:

(1) PUCCH resource group whose group identifier meets a fourth preset condition.

That is, the specified PUCCH resource group may be a PUCCH resource group whose group identifier meets the fourth preset condition in the plurality of PUCCH resource groups to which the target PUCCH resource belongs.

The fourth preset condition may include one of the following conditions: a group identifier being the largest, a group identifier being the smallest, and a group identifier being a preset value.

(2) PUCCH resource group in correspondence with a second specified TRP.

That is, in a case that there is a correspondence between TRPs and a plurality of PUCCH resource groups to which the target PUCCH resource belongs, the PUCCH resource group corresponding to the second specified TRP is used as the specified PUCCH resource group.

In the first application scenario in which the first preset condition includes that the first DCI is received from the one TRP, the second specified TRP is a TRP that sends the first DCI.

For example, it is assumed that the target PUCCH resource belongs to two PUCCH resource groups: a PUCCH resource group 1 and a PUCCH resource group 2, where the PUCCH resource group 1 corresponds to a TRP1, and the PUCCH resource group 2 corresponds to a TRP2. In this case, when the first DCI used to indicate that a PUCCH is to be transmitted on the target PUCCH resource is received from the TRP1, the TRP1 may be used as the second specified TRP. Correspondingly, the PUCCH resource group 1 corresponding to the TRP1 is used as the specified PUCCH resource group.

In the second application scenario in which the first preset condition includes that a plurality of pieces of DCI have been received from a plurality of TRPs, the second specified TRP is a TRP with a second preset identifier in the plurality of TRPs. The second preset identifier may be an identifier with a smallest index value, an identifier with a largest index value, an identifier with a preset index value, and so on.

For example, it is assumed that the target PUCCH resource belongs to two PUCCH resource groups: a PUCCH resource group 1 and a PUCCH resource group 2, where the PUCCH resource group 1 corresponds to a TRP1, and the PUCCH resource group 2 corresponds to a TRP2. In this case, when two pieces of DCI are received from the TRP1 and the TRP2, a TRP (TRP1) with the smallest index in the TRP1 and the TRP2 may be determined as the second specified TRP. Correspondingly, the PUCCH resource group 1 corresponding to the TRP1 is used as the specified PUCCH resource group.

In the third application scenario in which the first preset condition includes that a time point for sending a PUCCH by using the target PUCCH resource has arrived and that the target PUCCH resource is a periodic resource or a semi-persistent resource, the second specified TRP is a TRP corresponding to a most recent transmission from/to the terminal device. The most recent transmission includes one of any most recent transmission, any most recent downlink transmission, any most recent uplink transmission, a most recent specified channel transmission, and a most recent specified signal transmission.

For example, it is assumed that the target PUCCH resource belongs to two PUCCH resource groups: a PUCCH resource group 1 and a PUCCH resource group 2, where the PUCCH resource group 1 corresponds to a TRP1, and the PUCCH resource group 2 corresponds to a TRP2. The most recent transmission is any most recent transmission. In this case, when the time point for sending the PUCCH by using the target PUCCH resource has arrived, if the TRP corresponding to any most recent transmission is the TRP2, the TRP2 may be determined as the second specified TRP.

Correspondingly, the PUCCH resource group 2 corresponding to the TRP2 is used as the specified PUCCH resource group.

(3) PUCCH resource group in correspondence with a second specified object, where the specified object includes one of a specified resource, a specified channel, and a specified signal, and a value of a third preset parameter of the second specified object meets a fifth preset condition.

For example, when the second specified object is a specified control resource set group, and the third preset parameter is the group identifier of the control resource set group, the fifth preset condition includes at least one of the following conditions: a group identifier being the smallest, a group identifier being the largest, and a group identifier being a preset value.

In the first application scenario in which the first preset condition includes that the first DCI is received from the one TRP, the second specified object is a control resource set group in which the first DCI is located.

For example, it is assumed that the target PUCCH resource belongs to two PUCCH resource groups: a PUCCH resource group 1 and a PUCCH resource group 2, where the PUCCH resource group 1 corresponds to a CORESET group 1, the PUCCH resource group 2 corresponds to a CORESET group 2, a control resource set group of the TRP1 is the CORESET group 1, and a control resource set group of the TRP2 is the CORESET group 2. In this case, when the first DCI is received from the TRP1, the CORESET group 1 in which the first DCI is located may be determined as the second specified object. Correspondingly, the PUCCH resource group 1 corresponding to the CORESET group 1 is used as the specified PUCCH resource group.

In the second application scenario in which the first preset condition includes that a plurality of pieces of DCI have been received from a plurality of TRPs, the second specified object is a control resource set group whose group identifier meets the fifth preset condition in a plurality of control resource set groups in which the plurality of pieces of DCI are located.

For example, it is assumed that the target PUCCH resource belongs to two PUCCH resource groups: a PUCCH resource group 1 and a PUCCH resource group 2, where the PUCCH resource group 1 corresponds to a CORESET group 1, the PUCCH resource group 2 corresponds to a CORESET group 2, and the control resource set groups in which the plurality of pieces of DCI are located include the CORESET group 1 and the CORESET group 2. In this case, when the plurality of pieces of DCI are received from the TRP1 and the TRP2, a CORESET group 1 with a smallest group identifier (group ID) in the CORESET group 1 and the CORESET group 2 in which the plurality of pieces of DCI are located may be determined as the second specified object. Correspondingly, the PUCCH resource group 1 corresponding to the CORESET group 1 is used as the specified PUCCH resource group.

In the third application scenario in which the first preset condition includes that a time point for sending a PUCCH by using the target PUCCH resource has arrived and that the target PUCCH resource is a periodic resource or a semi-persistent resource, the second specified object is a control resource set group corresponding to a most recent transmission from/to the terminal device. The most recent transmission includes one of any most recent transmission, any most recent downlink transmission, any most recent uplink transmission, a most recent specified channel transmission, and a most recent specified signal transmission.

For example, it is assumed that the target PUCCH resource belongs to two PUCCH resource groups: a PUCCH resource group 1 and a PUCCH resource group 2, where the PUCCH resource group 1 corresponds to a CORESET group 1, and the PUCCH resource group 2 corresponds to a CORESET group 2. The most recent transmission is the most recent downlink channel, and a control resource set group corresponding to the most recent downlink channel is the CORESET group 2. Then, when the time point for sending a PUCCH on the target PUCCH resource has arrived, the CORESET group 2 may be determined as the second specified object. Correspondingly, the PUCCH resource group 2 corresponding to the CORESET group 2 is used as the specified PUCCH resource group.

The foregoing examples 1 and 2 are intended to describe that the terminal device may select one activation parameter from the at least one activation parameter according to a specific rule (which may be defined in a protocol) as the target parameter used for sending a PUCCH on the target PUCCH resource, and the network device does not need to individually configure or indicate a target parameter for each PUCCH resource, thereby reducing network resource overheads. In addition, the network device and the terminal device can also have the same understanding on the parameter used for sending the PUCCH, thereby ensuring correct transmission of the PUCCH and improving communication reliability.

Example 3

In a case that the target PUCCH resource has at least one activation parameter, the selecting one activation parameter from the at least one activation parameter as the target parameter used for sending a PUCCH on the target PUCCH resource may include: based on third information from the network device, selecting one activation parameter from the at least one activation parameter as the target parameter used for sending a PUCCH on the target PUCCH resource.

That is, in addition to selecting one activation parameter from the at least one activation parameter according to a specific rule as the target parameter used for sending a PUCCH on the target PUCCH resource in the foregoing examples 1 and 2, one activation parameter may alternatively be selected from the at least one activation parameter according to an indication of the network device as the target parameter used for sending a PUCCH on the target PUCCH resource.

The third information includes one of second DCI and a second MAC CE. The MAC CE means a media access control control element (MAC CE);

It should be noted that the second DCI may be DCI in which a newly defined signaling field is added to an existing DCI format, or may be newly added DCI with a dedicated DCI format, and the DCI is specially used to indicate the target parameter used for sending a PUCCH on the target PUCCH resource.

In the foregoing example 3, the network device and the terminal device can also have the same understanding on the parameter used for sending the PUCCH, thereby ensuring correct transmission of the PUCCH and improving communication reliability.

Example 4

In the third application scenario in which the first preset condition includes that a time point for sending a PUCCH by using the target PUCCH resource has arrived and that the target PUCCH resource is a periodic resource or a semi-persistent resource, the determining the target parameter used for sending a PUCCH on the target PUCCH resource in step 101 includes:

based on a periodicity of the target PUCCH resource, selecting one of the at least one activation parameter in turn as the target parameter used for sending a PUCCH on the target PUCCH resource.

For example, if the periodicity of the target PUCCH resource is 20 ms and the target PUCCH resource has two activation parameters, such as spatial relation 1 and spatial relation 2, spatial relation 1 may be used as a target spatial relation in the first period, spatial relation 2 may be used as a target spatial relation in the second period, spatial relation 1 may be used again as a target spatial relation in the third period, spatial relation 2 may be used again as a target spatial relation in the fourth period, and so on.

The foregoing example 4 can also be understood as that the terminal device selects one activation parameter from the at least one activation parameter according to a specific rule (which may be defined in a protocol) as the target parameter used for sending a PUCCH on the target PUCCH resource, and the network device does not need to individually configure or indicate a target parameter for each PUCCH resource, thereby reducing network resource overheads. In addition, the network device and the terminal device can also have the same understanding on the parameter used for sending the PUCCH, thereby ensuring correct transmission of the PUCCH and improving communication reliability.

Step 102: Send a PUCCH on the target PUCCH resource by using the target parameter.

Specifically, on the basis of the foregoing example 1, the target parameter is used for sending the PUCCH to the target TRP on the target PUCCH resource.

For example, in the first application scenario in which the first preset condition includes that the first DCI is received from the one TRP, the target TRP is a TRP that sends the first DCI.

For another example, in the second application scenario in which the first preset condition includes that a plurality of pieces of DCI have been received from a plurality of TRPs, the target TRP is one TRP corresponding to the target parameter in the plurality of TRPs that send the plurality of pieces of DCI, for example, the first specified TRP (when the PUCCH resources are not divided into groups) or the second specified TRP (when the PUCCH resources are divided into groups).

For still another example, in the third application scenario in which the first preset condition includes that a time point for sending a PUCCH by using the target PUCCH resource has arrived and that the target PUCCH resource is a periodic resource or a semi-persistent resource, the target TRP is a TRP corresponding to a most recent transmission. The most recent transmission includes one of any most recent transmission, any most recent downlink transmission, any most recent uplink transmission, a most recent specified channel, a most recent specified signal, and the like.

In the method for PUCCH transmission provided in this embodiment of this disclosure, on the one hand, because the terminal device may select one activation parameter from at least one activation parameter according to a specific rule (which may be defined in a protocol) as the target parameter used for sending a PUCCH on the target PUCCH resource, the network device does not need to individually configure or indicate a target parameter for each PUCCH resource, thereby reducing network resource overheads. On the other hand, in a case that the target PUCCH resource has the at least one activation parameter, one activation parameter can be selected as the target parameter used for sending a PUCCH on the target PUCCH resource, so that the network device and the terminal device have the same understanding on the parameter used for sending the PUCCH, to ensure correct transmission of the PUCCH and improve communication reliability.

Figure 2:
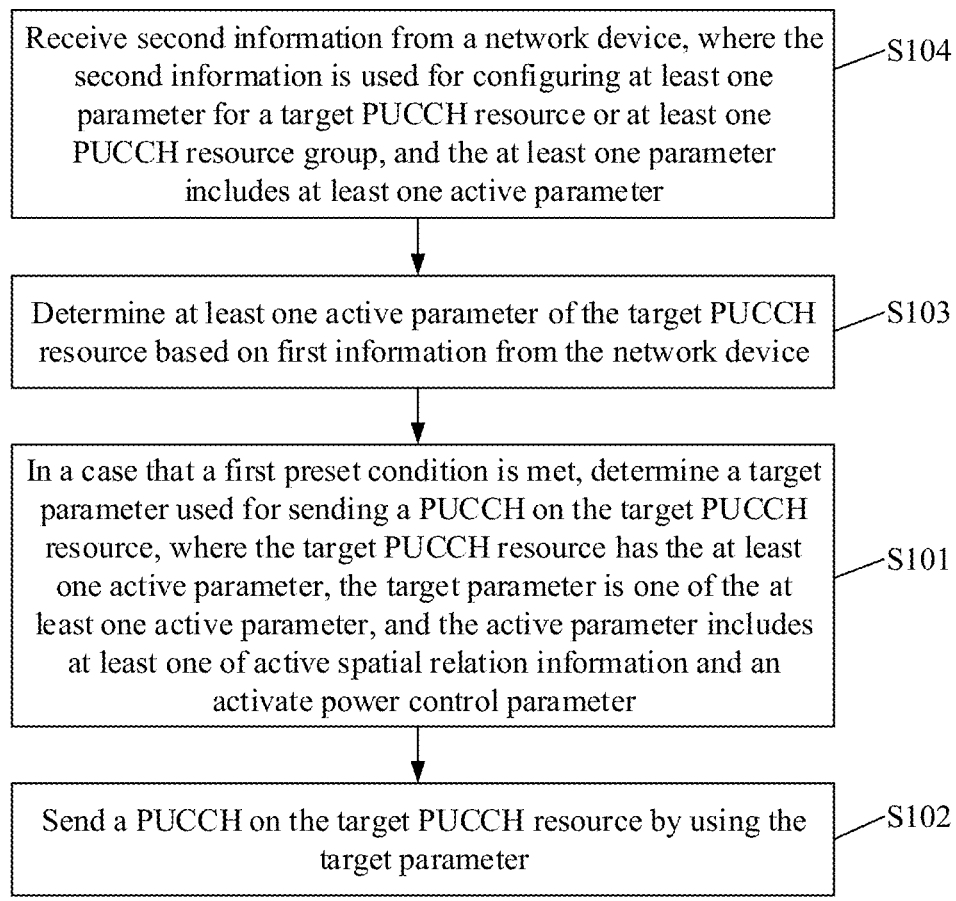
FIG. 2 is a second schematic flowchart of a method for PUCCH transmission according to an embodiment of this disclosure.

Optionally, as shown in FIG. 2, the method for PUCCH transmission provided in this embodiment of this disclosure may further include one of the following steps before step 101.

Step 104: Receive second information from a network device, where the second information is used for configuring the at least one parameter for the target PUCCH resource or the at least one PUCCH resource group, and the at least one parameter includes the at least one activation parameter.

The second information may be radio resource control (RRC) information. That is, the network device configures, by using the RRC information, at least one piece of spatial relation information for the target PUCCH resource, and/or at least one power control parameter (such as pathloss RS) for the target PUCCH resource.

Step 103: Determine the at least one activation parameter of the target PUCCH resource based on the first information from the network device; where the first information is used for determining the at least one activation parameter of the target PUCCH resource; or the first information is used for determining an activation parameter of at least one PUCCH resource group to which the target PUCCH resource belongs, where different PUCCH resource groups to which the target PUCCH resource belongs have different activation parameters.

The first information may be one of a first MAC CE and first RRC information.

It can be understood that the first information may be used to indicate at least one activation parameter of the target PUCCH resource for the terminal device for the first time, or may be used to indicate at least one activation parameter from the at least one parameter configured by the second information, or may be used to update at least one activation parameter already indicated for the target PUCCH resource.

For example, the network device indicates/updates, by using the first MAC CE, a plurality of pieces of activated spatial relation information for the target PUCCH resource, and/or the network device indicates/updates, by using the first MAC CE, a plurality of activated power control parameters for the target PUCCH resource. In specific implementation, the first MAC CE may be an existing MAC CE, and an existing reserved bit in the existing MAC CE is used to indicate/update the at least one activation parameter of the target PUCCH resource. Optionally, the MAC CE may specifically be a MAC CE used for indicating/updating one activation parameter for the target PUCCH resource in the related art; or the first MAC CE may be a newly-added MAC CE that is specially used for indicating at least one activation parameter.

In a case that the PUCCH resources are divided into groups, the target PUCCH resource belongs to at least one PUCCH resource group, and the network device may indicate/update, by using the first MAC CE, a plurality of pieces of activated spatial relation information for each PUCCH resource group, and/or the network device may indicate/update, by using the first MAC CE, a plurality of activated power control parameters for each PUCCH resource group.

It can be understood that when the target PUCCH resource belongs to a plurality of PUCCH resource groups and the network device indicates/updates one activation parameter separately for the plurality of PUCCH resource groups, the target PUCCH resource has a plurality of activation parameters. That is, in this embodiment of this disclosure, one PUCCH resource is allowed to have a plurality of activation parameters.

Figure 3:
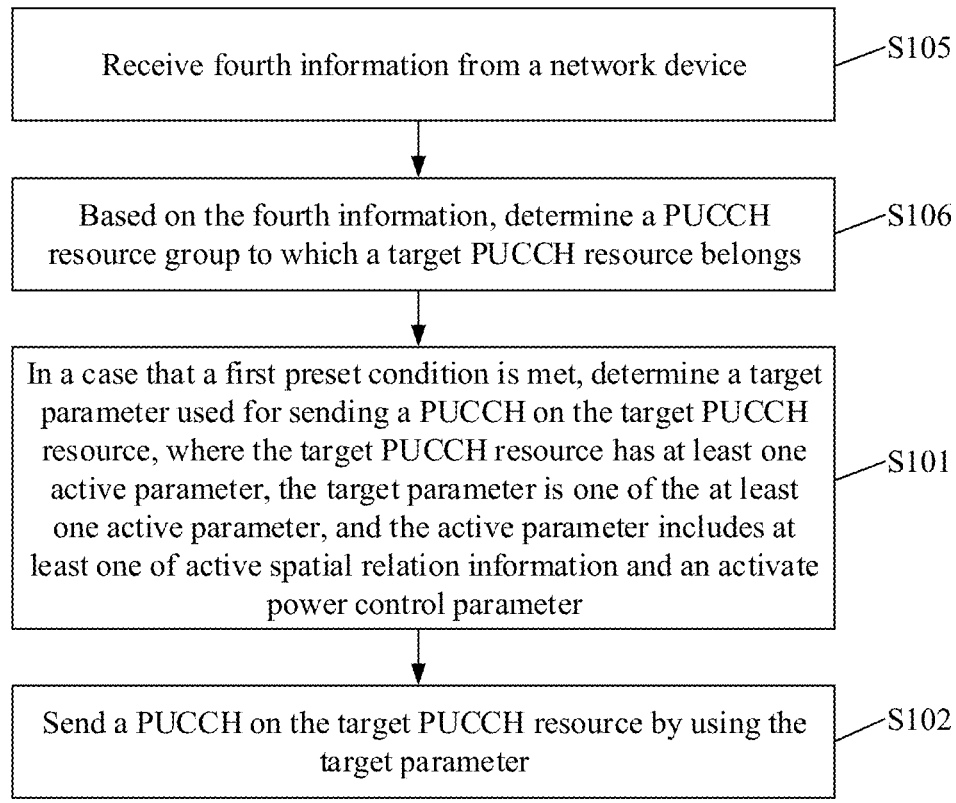
FIG. 3 is a third schematic flowchart of a method for PUCCH transmission according to an embodiment of this disclosure.

Optionally, as shown in FIG. 3, the method for PUCCH transmission provided in this embodiment of this disclosure may further include the following steps before step 101.

Step 105: Receive fourth information from the network device.

Step 106: Based on the fourth information, determine a PUCCH resource group to which the target PUCCH resource belongs.

In a first implementation of this embodiment, the fourth information may be RRC information, the fourth information is used for configuring the target PUCCH resource for the terminal device, the fourth information includes first target information, and the first target information is used for determining the PUCCH resource group to which the target PUCCH resource belongs. That is, grouping the target PUCCH resource may be performed by using the RRC for configuring the target PUCCH resource for the terminal device.

The first target information may include any one of the following information:
  identification information of the PUCCH resource group to which the target PUCCH resource belongs;
  identification information of a TRP to which the target PUCCH resource belongs; and
  identification information of a control resource set group corresponding to the target PUCCH resource.

Such information may be all used to indicate information about the PUCCH resource group to which the target PUCCH resource belongs.

For example, a group id of the PUCCH resource group may be added to a parameter PUCCH-config of the RRC information; or a new upper-layer parameter of a parameter PUCCH-config is added to indicate a group id of the PUCCH resource group and PUCCH resource information belonging to the group is indicated in the newly added upper-layer parameter. Optionally, the group id of the PUCCH resource group may alternatively be identified by TRP id, CORESET group id, or the like.

In a second implementation of this embodiment, the fourth information is RRC information, and the determining, based on the fourth information, the PUCCH resource group to which the target PUCCH resource belongs includes:
  based on identification information of a bandwidth part (BWP) in the RRC information, determining a PUCCH resource group to which the target PUCCH resource belongs, where PUCCH resources on one BWP belong to one PUCCH resource group.

This implementation is intended to describe that when all PUCCH resources in one BWP belong to one group, group information of the PUCCH resource may not be explicitly configured by using the RRC information, but be determined by using identification information of the BWP.

In a third implementation of this embodiment, the fourth information is one of the following third MAC CE and fourth MAC CE.

The third MAC CE is used to divide PUCCH resources into groups, and the third MAC CE includes second target information. For example, an existing MAC CE is used as the third MAC CE to indicate group information of the PUCCH resource group to which the target PUCCH resource belongs, and/or to indicate information about PUCCH resources included in the PUCCH resource group.

For another example, one newly-added MAC CE is used as the third MAC CE to indicate group information of the PUCCH resource group to which the target PUCCH resource belongs, and/or to indicate information about PUCCH resources included in the PUCCH resource group.

In addition, when the existing MAC CE is used as the third MAC CE, at least one specific bit (such as a reserved bit) in the MAC CE may be used to explicitly indicate the group information of the target PUCCH resource; or an existing bit included in the MAC CE may be used to implicitly indicate the group information of the target PUCCH resource (for example, values of existing indication fields implicitly indicate the group information).

The fourth MAC CE is used to indicate at least one activation parameter of the target PUCCH resource or the PUCCH resource group to which the target PUCCH resource belongs, and the fourth MAC CE includes second target information. That is, the MAC CE indicating the at least one activation parameter may be used to indicate the group information of the target PUCCH resource, and the fourth MAC CE and the first MAC CE described above may be the same MAC CE. Optionally, the fourth MAC CE may be an existing MAC CE or a newly added MAC CE.

The second target information in the third MAC CE and the fourth MAC CE is used for determining the PUCCH resource group to which the target PUCCH resource belongs.

The foregoing describes the method for PUCCH transmission applied to the terminal device. The following describes a method for information configuration according to an embodiment of this disclosure with reference to FIG. 4 to FIG. 6.

Figure 4:
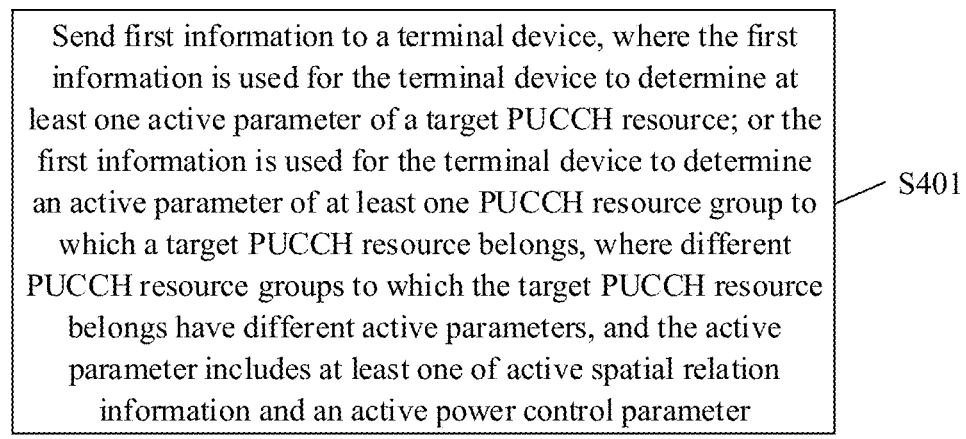
FIG. 4 is a first schematic flowchart of a method for information configuration according to an embodiment of this disclosure.

As shown in FIG. 4, an embodiment of this disclosure provides a method for information configuration applied to a network device. The method may include the following steps.

Step 401: Send first information to a terminal device, where the first information is used for the terminal device to determine at least one activation parameter of a target PUCCH resource; or the first information is used for the terminal device to determine an activation parameter of at least one PUCCH resource group to which a target PUCCH resource belongs, where different PUCCH resource groups to which the target PUCCH resource belongs have different activation parameters, and the activation parameter includes at least one of activated spatial relation information and an activated power control parameter.

The first information may be one of a first MAC CE and first RRC information.

It can be understood that the first information may be used to indicate at least one activation parameter of the target PUCCH resource for the terminal device for the first time, or may be used to update at least one activation parameter already indicated for the target PUCCH resource.

For example, the network device indicates/updates, by using the first MAC CE, a plurality of pieces of activated spatial relation information for the target PUCCH resource, and/or the network device indicates/updates, by using the first MAC CE, a plurality of activated power control parameters for the target PUCCH resource. In specific implementation, the first MAC CE may be an existing MAC CE, and an existing reserved bit in the existing MAC CE is used to indicate/update the at least one activation parameter of the target PUCCH resource. Optionally, the MAC CE may specifically be a MAC CE used for indicating/updating one activation parameter for the target PUCCH resource in the related art; or the first MAC CE may be a newly-added MAC CE that is specially used for indicating at least one activation parameter.

In a case that the PUCCH resources are divided into groups, the target PUCCH resource belongs to at least one PUCCH resource group, and the network device may indicate/update, by using the first MAC CE, a plurality of pieces of activated spatial relation information for each PUCCH resource group, and/or the network device may indicate/update, by using the first MAC CE, a plurality of activated power control parameters for each PUCCH resource group.

It can be understood that when the target PUCCH resource belongs to a plurality of PUCCH resource groups and the network device indicates/updates one activation parameter separately for the plurality of PUCCH resource groups, the target PUCCH resource has a plurality of activation parameters. That is, in this embodiment of this disclosure, one PUCCH resource is allowed to have a plurality of activation parameters.

Figure 5:
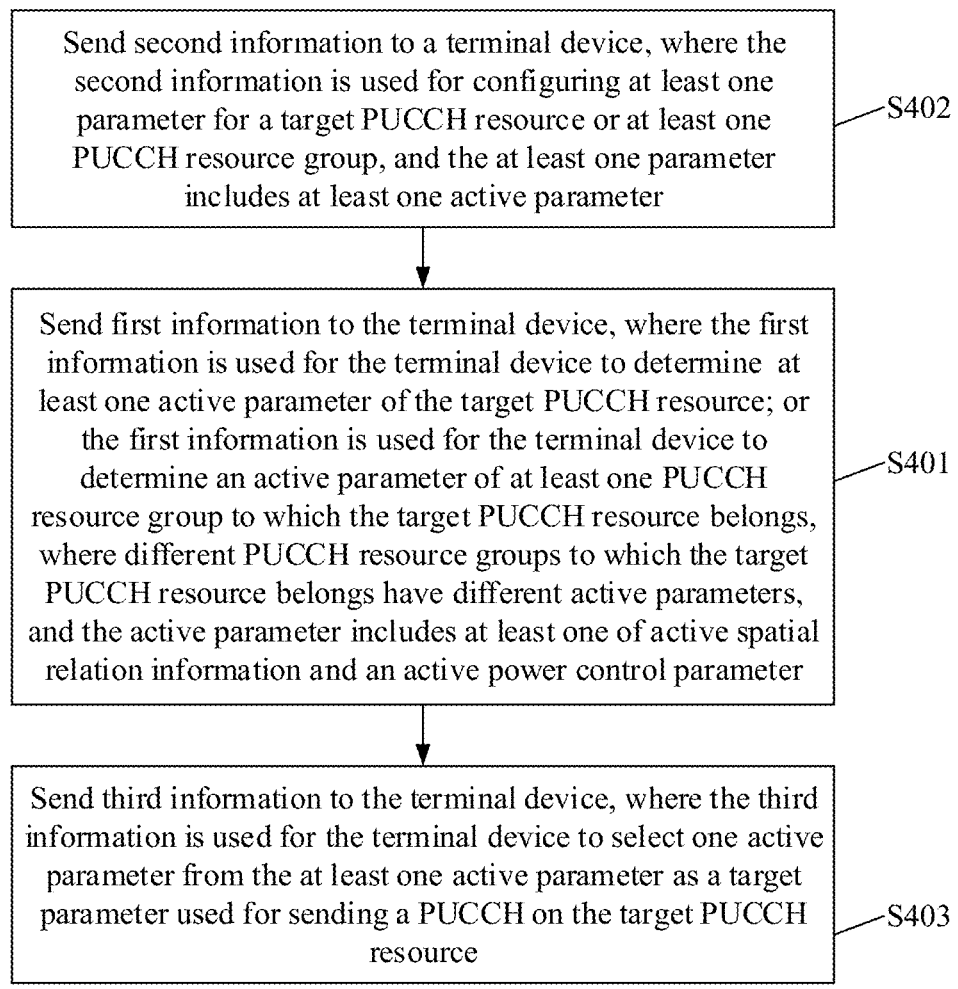
FIG. 5 is a second schematic flowchart of a method for information configuration according to an embodiment of this disclosure.

Optionally, as shown in FIG. 5, the method for information configuration provided in this embodiment of this disclosure may further include the following steps before step 401.

Step 402: Send second information to the terminal device, where the second information is used for configuring at least one parameter for the target PUCCH resource or the at least one PUCCH resource group, and the at least one parameter includes the at least one activation parameter.

The second information may be RRC information. That is, the network device configures, by using the RRC information, at least one piece of spatial relation information for the target PUCCH resource, and/or at least one activated power control parameter (such as RS) for the target PUCCH resource.

Optionally, as shown in FIG. 5, the method for information configuration provided in this embodiment of this disclosure may further include the following step after step 401.

Step 403: Send third information to the terminal device, where the third information is used for the terminal device to select one activation parameter from the at least one activation parameter as a target parameter used for sending a PUCCH on the target PUCCH resource.

The third information includes one of second DCI and a second MAC CE.

It should be noted that the second DCI may be DCI in which a newly defined signaling field is added to an existing DCI format, or may be newly added DCI with a dedicated DCI format, and the DCI is specially used to indicate the target parameter used for sending a PUCCH on the target PUCCH resource.

Figure 6:
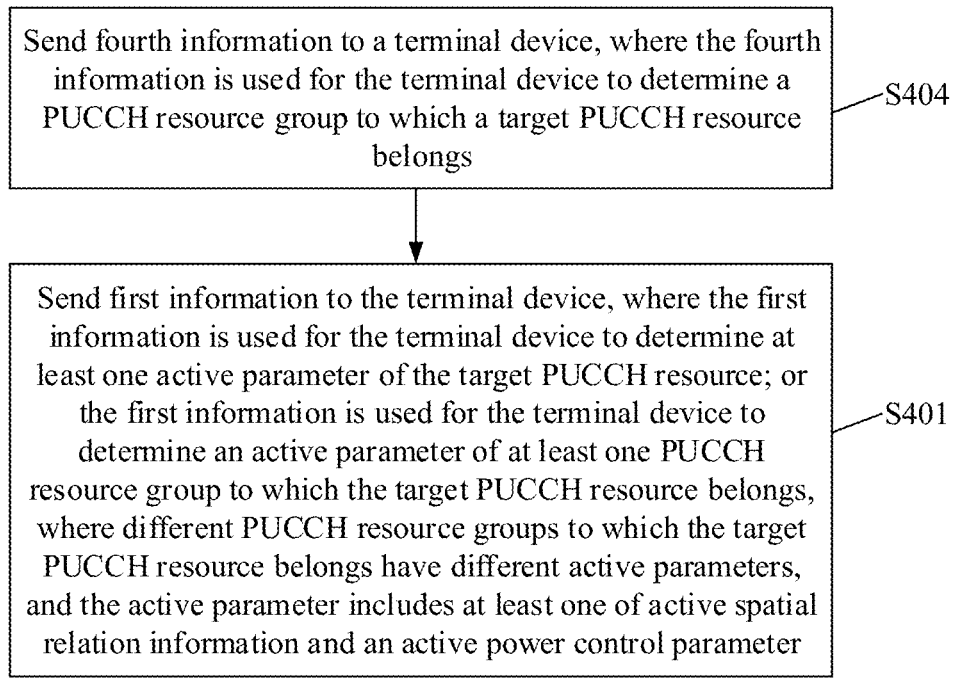
FIG. 6 is a third schematic flowchart of a method for information configuration according to an embodiment of this disclosure.

Optionally, as shown in FIG. 6, the method for information configuration provided in this embodiment of this disclosure may further include the following step before step 401.

Step 404: Send fourth information to the terminal device, where the fourth information is used for the terminal device to determine the PUCCH resource group to which the target PUCCH resource belongs.

In a first implementation of this embodiment, the fourth information may be RRC information, the fourth information is used for configuring the target PUCCH resource for the terminal device, the fourth information includes first target information, and the first target information is used for determining the PUCCH resource group to which the target PUCCH resource belongs. That is, grouping the target PUCCH resource may be performed by using the RRC for configuring the target PUCCH resource for the terminal device.

The first target information may include any one of the following information:
- identification information of the PUCCH resource group to which the target PUCCH resource belongs;
- identification information of a TRP to which the target PUCCH resource belongs; and
- identification information of a control resource set group corresponding to the target PUCCH resource.

Such information may be all used to indicate information about the PUCCH resource group to which the target PUCCH resource belongs.

For example, a group id of the PUCCH resource group may be added to a parameter PUCCH-config of the RRC information; or a new upper-layer parameter of a parameter PUCCH-config is added to indicate a group id of the PUCCH resource group and PUCCH resource information belonging to the group is indicated in the newly added upper-layer parameter. Optionally, the group id of the PUCCH resource group may alternatively be identified by TRP id, CORESET group id, or the like.

In a second implementation of this embodiment, the fourth information is RRC information, and identification information of a BWP in the RRC information may be used for determining the PUCCH resource group to which the target PUCCH resource belongs, and PUCCH resources in one BWP belong to one PUCCH resource group.

This implementation is intended to describe that when all PUCCH resources in one BWP belong to one group, group information of the PUCCH resource may not be explicitly configured by using the RRC information, but be determined by using identification information of the BWP.

In a third implementation of this embodiment, the fourth information is one of the following third MAC CE and fourth MAC CE.

The third MAC CE is used to divide PUCCH resources into groups, and the third MAC CE includes second target information. For example, an existing MAC CE is used as the third MAC CE to indicate group information of the PUCCH resource group to which the target PUCCH resource belongs, and/or to indicate information about PUCCH resources included in the PUCCH resource group. For another example, one newly-added MAC CE is used as the third MAC CE to indicate group information of the PUCCH resource group to which the target PUCCH resource belongs, and/or to indicate information about PUCCH resources included in the PUCCH resource group.

In addition, when the existing MAC CE is used as the third MAC CE, at least one specific bit (such as a reserved bit) in the MAC CE may be used to explicitly indicate the group information of the target PUCCH resource; or an existing bit included in the MAC CE may be used to implicitly indicate the group information of the target PUCCH resource (for example, values of existing indication fields implicitly indicate the group information).

The fourth MAC CE is used to indicate at least one activation parameter of the target PUCCH resource or the PUCCH resource group to which the target PUCCH resource belongs, and the fourth MAC CE includes second target information. That is, the MAC CE indicating the at least one activation parameter may be used to indicate the group information of the target PUCCH resource, and the fourth MAC CE and the first MAC CE described above may be the same MAC CE. Optionally, the fourth MAC CE may be an existing MAC CE or a newly added MAC CE.

The second target information in the third MAC CE and the fourth MAC CE is used for determining the PUCCH resource group to which the target PUCCH resource belongs.

The foregoing describes the method for information configuration applied to the network device, and the following describes a terminal device and a network device in the embodiments of this disclosure in detail with reference to FIG. 7 to FIG. 12.

Figure 7:
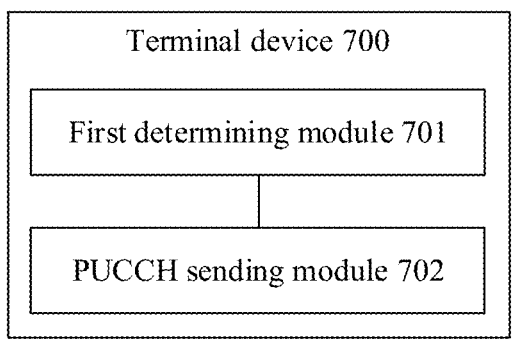
FIG. 7 is a first schematic structural diagram of a terminal device according to an embodiment of this disclosure.

FIG. 7 is a schematic structural diagram of a terminal device according to an embodiment of this disclosure. As shown in FIG. 7, the terminal device 700 may include: a first determining module 701 and a PUCCH sending module 702.

The first determining module 701 is configured to: in a case that a first preset condition is met, determine a target parameter used for sending a PUCCH on a target PUCCH resource, where the target PUCCH resource has at least one activation parameter, the target parameter is one of the at least one activation parameter, and the activation parameter includes at least one of activated spatial relation information and a power control parameter.

The first preset condition includes but is not limited to one of the following three conditions:

Condition 1: First DCI has been received from one TRP, where the first DCI is used to indicate that a PUCCH is to be transmitted on the target PUCCH resource.

Condition 2: A plurality of pieces of DCI have been received from a plurality of TRPs, where the plurality of pieces of DCI are used to indicate that a PUCCH is to be transmitted on the target PUCCH resource.

Condition 3: A time point for sending a PUCCH by using the target PUCCH resource has arrived, where the target PUCCH resource is a periodic resource or a semi-persistent resource.

It can be understood that the foregoing three first preset conditions respectively correspond to three different application scenarios.

In the foregoing three different application scenarios, the first determining module 701 may be configured to select one activation parameter from the at least one activation parameter as the target parameter used for sending a PUCCH on the target PUCCH resource. The following uses several examples for description.

Example 1

The first determining module 701 is specifically configured to: in a case that PUCCH resources are not divided into groups, determine a first activation parameter of the at least one activation parameter as the target parameter used for sending a PUCCH on the target PUCCH resource.

The first activation parameter is one of the following activation parameters:

(1) Activation parameter in correspondence with a first specified TRP.

In the first application scenario in which the first preset condition includes that first DCI has been received from one TRP, the first specified TRP is a TRP that sends the first DCI.

In the second application scenario in which the first preset condition includes that a plurality of pieces of DCI have been received from a plurality of TRPs, the first specified TRP is a TRP with a first preset identifier in the plurality of TRPs.

In the third application scenario in which the first preset condition includes that a time point for sending a PUCCH by using the target PUCCH resource has arrived and that the target PUCCH resource is a periodic resource or a semi-persistent resource, the first specified TRP may be a TRP corresponding to a most recent transmission from/to the terminal device. The most recent transmission includes one of any most recent transmission, any most recent downlink transmission, any most recent uplink transmission, a most recent specified channel transmission, and a most recent specified signal transmission.

(2) Activation parameter in correspondence with a first specified object, where the first specified object includes one of a specified resource, a specified channel, and a specified signal, and a value of a first preset parameter of the first specified object meets a second preset condition.

That is, in a case that there is a correspondence between the at least one activation parameter of the target PUCCH resource and specified objects, the activation parameter corresponding to the first specified object is used as the first activation parameter.

In the first application scenario in which the first preset condition includes that first DCI has been received from one TRP, the first specified object may be a specified object of a TRP that sends the first DCI, for example, a specified channel, specified signal, or control resource set (CORESET) group of the TRP that sends the first DCI.

In the second application scenario in which the first preset condition includes that a plurality of pieces of DCI have been received from a plurality of TRPs, the first specified object is a control resource set group whose group identifier meets the second preset condition in a plurality of control resource set groups in which the plurality of pieces of DCI are located.

The second preset condition may include, but is not limited to, at least one of a group identifier being the smallest, a group identifier being the largest, and a group identifier being a preset value.

In the third application scenario in which the first preset condition includes that a time point for sending a PUCCH by using the target PUCCH resource has arrived and that the target PUCCH resource is a periodic resource or a semi-persistent resource, the first specified object may be a control resource set group corresponding to a most recent transmission from/to the terminal device. The most recent transmission includes one of any most recent transmission, any most recent downlink transmission, any most recent uplink transmission, a most recent specified channel transmission, and a most recent specified signal transmission.

(3) Activation parameter whose second preset parameter with a value meeting a third preset condition.

The second preset parameter includes an RS, and the value of the second preset parameter includes at least one of a type and an index value of the reference signal; or the second preset parameter includes a source RS, and the second preset parameter includes at least one of a type and an index value of the source reference signal.

Example 2

The first determining module 701 is specifically configured to: in a case that PUCCH resources are divided into groups, determine a second activation parameter of the at least one activation parameter as the target parameter used for sending a PUCCH on the target PUCCH resource. The second activation parameter is an activation parameter of a specified PUCCH resource group, and the specified PUCCH resource group includes the target PUCCH resource.

That is, in a case that the PUCCH resources are divided into groups, an activation parameter of a specified PUCCH resource group in the at least one PUCCH resource group to which the target PUCCH resource belongs is determined as the target parameter used for sending a PUCCH on the target PUCCH resource.

The specified PUCCH resource group may be one of the following PUCCH resource groups:

(1) PUCCH resource group whose group identifier meets a fourth preset condition

That is, the specified PUCCH resource group may be a PUCCH resource group whose group identifier meets the fourth preset condition in the plurality of PUCCH resource groups to which the target PUCCH resource belongs. The fourth preset condition may include one of the following conditions: a group identifier being the largest, a group identifier being the smallest, and a group identifier being a preset value.

(2) PUCCH resource group in correspondence with a second specified TRP

That is, in a case that there is a correspondence between TRPs and a plurality of PUCCH resource groups to which the target PUCCH resource belongs, the PUCCH resource group corresponding to the second specified TRP is used as the specified PUCCH resource group.

In the first application scenario in which the first preset condition includes that first DCI has been received from one TRP, the second specified TRP is a TRP that sends the first DCI.

In the second application scenario in which the first preset condition includes that a plurality of pieces of DCI have been received from a plurality of TRPs, the second specified TRP is a TRP with a second preset identifier in the plurality of TRPs. The second preset identifier may be an identifier with a smallest index value, an identifier with a largest index value, an identifier with a preset index value, and so on.

In the third application scenario in which the first preset condition includes that a time point for sending a PUCCH by using the target PUCCH resource has arrived and that the target PUCCH resource is a periodic resource or a semi-persistent resource, the second specified TRP is a TRP corresponding to a most recent transmission from/to the terminal device. The most recent transmission includes one of any most recent transmission, any most recent downlink transmission, any most recent uplink transmission, a most recent specified channel transmission, and a most recent specified signal transmission.

(3) PUCCH resource group in correspondence with a second specified object, where the specified object includes one of a specified resource, a specified channel, and a specified signal, and a value of a third preset parameter of the second specified object meets a fifth preset condition.

For example, when the second specified object is a specified control resource set group, and the third preset parameter is the group identifier of the control resource set group, the fifth preset condition includes at least one of the following conditions: a group identifier being the smallest, a group identifier being the largest, and a group identifier being a preset value.

In the first application scenario in which the first preset condition includes that the first DCI is received from the one TRP, the second specified object is a control resource set group in which the first DCI is located.

In the second application scenario in which the first preset condition includes that a plurality of pieces of DCI have been received from a plurality of TRPs, the second specified object is a control resource set group whose group identifier meets the fifth preset condition in a plurality of control resource set groups in which the plurality of pieces of DCI are located.

In the third application scenario in which the first preset condition includes that a time point for sending a PUCCH by using the target PUCCH resource has arrived and that the target PUCCH resource is a periodic resource or a semi-persistent resource, the second specified object is a control resource set group corresponding to a most recent transmission from/to the terminal device. The most recent transmission includes one of any most recent transmission, any most recent downlink transmission, any most recent uplink transmission, a most recent specified channel transmission, and a most recent specified signal transmission.

The foregoing examples 1 and 2 are intended to describe that the terminal device may select one activation parameter from the at least one activation parameter according to a specific rule (which may be defined in a protocol) as the target parameter used for sending a PUCCH on the target PUCCH resource, and the network device does not need to individually configure or indicate a target parameter for each PUCCH resource, thereby reducing network resource overheads. In addition, the network device and the terminal device can also have the same understanding on the parameter used for sending the PUCCH, thereby ensuring correct transmission of the PUCCH and improving communication reliability.

Example 3

In a case that the target PUCCH resource has at least one activation parameter, the first determining module 701 may be specifically configured to: based on third information from the network device, select one activation parameter from the at least one activation parameter as the target parameter used for sending a PUCCH on the target PUCCH resource.

That is, in addition to selecting one activation parameter from the at least one activation parameter according to a specific rule as the target parameter used for sending a PUCCH on the target PUCCH resource in the foregoing examples 1 and 2, one activation parameter may alternatively be selected from the at least one activation parameter according to an indication of the network device as the target parameter used for sending a PUCCH on the target PUCCH resource.

The third information includes one of second DCI and a second MAC CE.

In the foregoing example 3, the network device and the terminal device can also have the same understanding on the parameter used for sending the PUCCH, thereby ensuring correct transmission of the PUCCH and improving communication reliability.

Example 4

In the third application scenario in which the first preset condition includes that a time point for sending a PUCCH by using the target PUCCH resource has arrived and that the target PUCCH resource is a periodic resource or a semi-persistent resource, the first determining module 701 may be specifically configured to: based on a periodicity of the target PUCCH resource, select one of the at least one activation parameter in turn as the target parameter used for sending a PUCCH on the target PUCCH resource.

The foregoing example 4 can also be understood as that the terminal device selects one activation parameter from the at least one activation parameter according to a specific rule (which may be defined in a protocol) as the target parameter used for sending a PUCCH on the target PUCCH resource, and the network device does not need to individually configure or indicate a target parameter for each PUCCH resource, thereby reducing network resource overheads. In addition, the network device and the terminal device can also have the same understanding on the parameter used for sending the PUCCH, thereby ensuring correct transmission of the PUCCH and improving communication reliability.

a PUCCH sending module 702, configured to send a PUCCH on the target PUCCH resource by using the target parameter.

Specifically, the PUCCH sending module 702 may be configured to: send the PUCCH to a target TRP on the target PUCCH resource by using the target parameter.

For example, in the first application scenario, the target TRP is a TRP that sends the first DCI. For another example, in the second application scenario, the target TRP is one TRP corresponding to the target parameter in the plurality of TRPs that send the plurality of pieces of DCI, for example, the first specified TRP (when PUCCH resources are not divided into groups) or the second specified TRP (when PUCCH resources are divided into groups). For another example, in the third application scenario, the target TRP is a TRP corresponding to a most recent transmission, where the most recent transmission includes one of any most recent transmission, any most recent downlink transmission, any most recent uplink transmission, a most recent specified channel, a most recent specified signal, and the like.

On the one hand, the terminal device 700 provided in this embodiment of this disclosure may select one activation parameter from at least one activation parameter according to a specific rule (which may be defined in a protocol) as the target parameter used for sending a PUCCH on the target PUCCH resource, and the network device does not need to individually configure or indicate a target parameter for each PUCCH resource, thereby reducing network resource overheads. On the other hand, in a case that the target PUCCH resource has the at least one activation parameter, one activation parameter can be selected as the target parameter used for sending a PUCCH on the target PUCCH resource, so that the network device and the terminal device have the same understanding on the parameter used for sending the PUCCH, to ensure correct transmission of the PUCCH and improve communication reliability.

Figure 8:
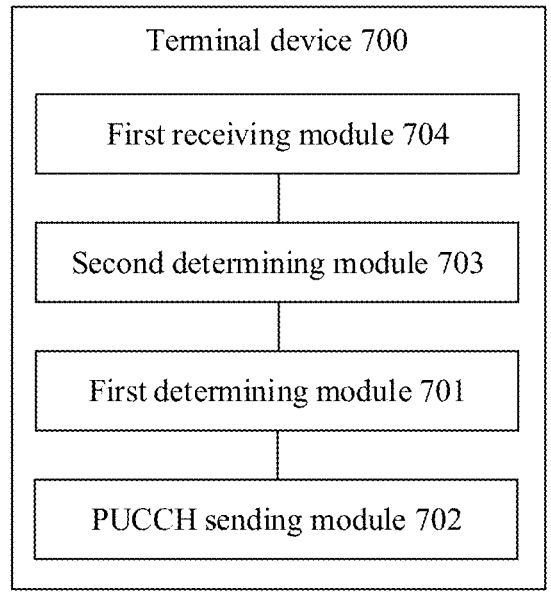
FIG. 8 is a second schematic structural diagram of a terminal device according to an embodiment of this disclosure.

Optionally, as shown in FIG. 8, the terminal device 700 provided in this embodiment of this disclosure may further include:

a first receiving module 704, configured to receive second information from the network device, where the second information is used for configuring at least one parameter for the target PUCCH resource or the at least one PUCCH resource group, and the at least one parameter includes the at least one activation parameter, where the second information may be RRC information; and a second determining module 703, configured to determine the at least one activation parameter of the target PUCCH resource based on the first information from the network device; where the first information is used for determining the at least one activation parameter of the target PUCCH resource; or the first information is used for determining an activation parameter of at least one PUCCH resource group to which the target PUCCH resource belongs, where different PUCCH resource groups to which the target PUCCH resource belongs have different activation parameters.

The first information may be one of a first MAC CE and first RRC information.

It can be understood that the first information may be used to indicate at least one activation parameter of the target PUCCH resource for the terminal device for the first time, or may be used to indicate at least one activation parameter from the at least one parameter configured by the second information, or may be used to update at least one activation parameter already indicated for the target PUCCH resource.

In a case that the PUCCH resources are divided into groups, the target PUCCH resource belongs to at least one PUCCH resource group, and the network device may indicate/update, by using the first MAC CE, a plurality of pieces of activated spatial relation information for each PUCCH resource group, and/or the network device may indicate/update, by using the first MAC CE, a plurality of activated power control parameters for each PUCCH resource group.

It can be understood that when the target PUCCH resource belongs to a plurality of PUCCH resource groups and the network device indicates/updates one activation parameter separately for the plurality of PUCCH resource groups, the target PUCCH resource has a plurality of activation parameters. That is, in this embodiment of this disclosure, one PUCCH resource is allowed to have a plurality of activation parameters.

Figure 9:
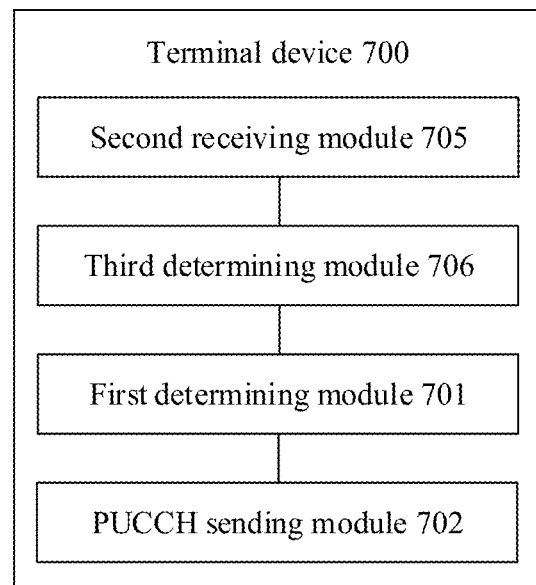
FIG. 9 is a third schematic structural diagram of a terminal device according to an embodiment of this disclosure.

Optionally, as shown in FIG. 9, the terminal device 700 provided in this embodiment of this disclosure may further include:
- a second receiving module 705, configured to receive fourth information from the network device; and
- a third determining module 706, configured to determine, based on the fourth information, the PUCCH resource group to which the target PUCCH resource belongs.

In a first implementation of this embodiment, the fourth information may be RRC information, the fourth information is used for configuring the target PUCCH resource for the terminal device, the fourth information includes first target information, and the first target information is used for determining the PUCCH resource group to which the target PUCCH resource belongs. That is, grouping the target PUCCH resource may be performed by using the RRC for configuring the target PUCCH resource for the terminal device.

The first target information may include any one of the following information:
- identification information of the PUCCH resource group to which the target PUCCH resource belongs;
- identification information of a TRP to which the target PUCCH resource belongs; and
- identification information of a control resource set group corresponding to the target PUCCH resource.

Such information may be all used to indicate information about the PUCCH resource group to which the target PUCCH resource belongs.

In a second implementation of this embodiment, the third determining module 706 may be configured to: based on identification information of a BWP in RRC information, determine the PUCCH resource group to which the target PUCCH resource belongs, where PUCCH resources in one BWP belong to one PUCCH resource group. This implementation is intended to describe that when all PUCCH resources in one BWP belong to one group, group information of the PUCCH resource may not be explicitly configured by using the RRC information, but be determined by using identification information of the BWP.

In a third implementation of this embodiment, the fourth information is one of the following third MAC CE and fourth MAC CE.

The third MAC CE is used to divide PUCCH resources into groups, and the third MAC CE includes second target information.

The fourth MAC CE is used to indicate at least one activation parameter of the target PUCCH resource or the PUCCH resource group to which the target PUCCH resource belongs, and the fourth MAC CE includes second target information.

The second target information in the third MAC CE and the fourth MAC CE is used for determining the PUCCH resource group to which the target PUCCH resource belongs.

The terminal device 700 shown in FIG. 7 may be configured to implement the embodiment of the method for PUCCH transmission shown in FIG. 1. For related details, refer to the foregoing method embodiment.

The foregoing describes the terminal device 700, and the following describes a network device 1000 provided in an embodiment of this disclosure with reference to FIG. 9.

Figure 10:
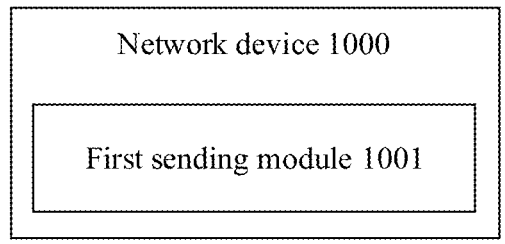
FIG. 10 is a first schematic structural diagram of a network device according to an embodiment of this disclosure.

FIG. 10 is a schematic structural diagram of a network device according to an embodiment of this disclosure. As shown in FIG. 10, the network device 1000 may include:
- a first sending module 1001, configured to send first information to a terminal device, where the first information is used for the terminal device to determine at least one activation parameter of a target PUCCH resource; or the first information is used for the terminal device to determine an activation parameter of at least one PUCCH resource group to which a target PUCCH resource belongs, where different PUCCH resource groups to which the target PUCCH resource belongs have different activation parameters, and the activation parameter includes at least one of activated spatial relation information and an activated power control parameter.

The first information may be one of a first MAC CE and first RRC information.

It can be understood that the first information may be used to indicate at least one activation parameter of the target PUCCH resource for the terminal device for the first time, or may be used to indicate at least one activation parameter from the at least one parameter configured by the second information, or may be used to update at least one activation parameter already indicated for the target PUCCH resource.

In a case that the PUCCH resources are divided into groups, the target PUCCH resource belongs to at least one PUCCH resource group, and the network device may indicate/update, by using the first MAC CE, a plurality of pieces of activated spatial relation information for each PUCCH resource group, and/or the network device may indicate/update, by using the first MAC CE, a plurality of activated power control parameters for each PUCCH resource group.

It can be understood that when the target PUCCH resource belongs to a plurality of PUCCH resource groups and the network device indicates/updates one activation parameter separately for the plurality of PUCCH resource groups, the target PUCCH resource has a plurality of activation parameters. That is, in this embodiment of this disclosure, one PUCCH resource is allowed to have a plurality of activation parameters.

Figure 11:
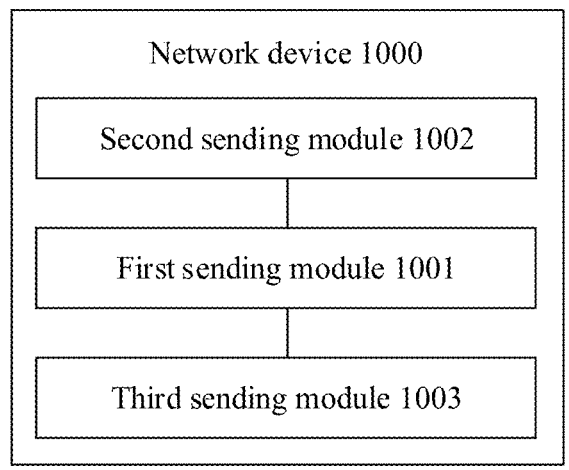
FIG. 11 is a second schematic structural diagram of a network device according to an embodiment of this disclosure.

Optionally, as shown in FIG. 11, the network device 1000 provided in this embodiment of this disclosure may further include:
- a second sending module 1002, configured to send second information to the terminal device, where the second information is used for configuring at least one parameter for the target PUCCH resource or the at least one PUCCH resource group, and the at least one parameter includes the at least one activation parameter.

The second information may be RRC information.

Optionally, as shown in FIG. 11, the network device 1000 provided in this embodiment of this disclosure may further include:

a third sending module 1003, configured to send third information to the terminal device, where the third information is used for the terminal device to select one activation parameter from the at least one activation parameter as a target parameter used for sending a PUCCH on the target PUCCH resource.

The third information includes one of second DCI and a second MAC CE.

It should be noted that the second DCI may be DCI in which a newly defined signaling field is added to an existing DCI format, or may be newly added DCI with a dedicated DCI format, and the DCI is specially used to indicate the target parameter used for sending a PUCCH on the target PUCCH resource.

Figure 12:
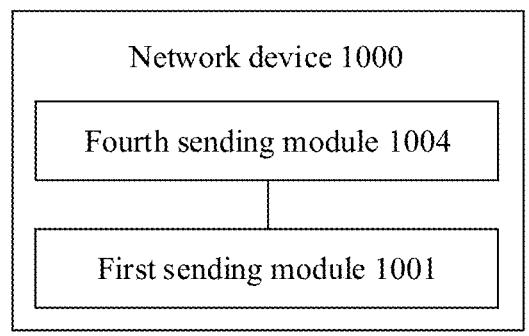
FIG. 12 is a third schematic structural diagram of a network device according to an embodiment of this disclosure.

Optionally, as shown in FIG. 12, the network device 1000 provided in this embodiment of this disclosure may further include:

a fourth sending module 1004, configured to Send fourth information to the terminal device, where the fourth information is used for the terminal device to determine the PUCCH resource group to which the target PUCCH resource belongs.

In a first implementation of this embodiment, the fourth information may be RRC information, the fourth information is used for configuring the target PUCCH resource for the terminal device, the fourth information includes first target information, and the first target information is used for determining the PUCCH resource group to which the target PUCCH resource belongs.

The first target information may include any one of the following information:

identification information of the PUCCH resource group to which the target PUCCH resource belongs;

identification information of a TRP to which the target PUCCH resource belongs; and identification information of a control resource set group corresponding to the target PUCCH resource.

Such information may be all used to indicate information about the PUCCH resource group to which the target PUCCH resource belongs.

In a second implementation of this embodiment, the fourth information is RRC information, and identification information of a BWP in the RRC information may be used for determining the PUCCH resource group to which the target PUCCH resource belongs, and PUCCH resources in one BWP belong to one PUCCH resource group.

In a third implementation of this embodiment, the fourth information is one of the following third MAC CE and fourth MAC CE.

The third MAC CE is used to divide PUCCH resources into groups, and the third MAC CE includes second target information. The fourth MAC CE is used to indicate at least one activation parameter of the target PUCCH resource or the PUCCH resource group to which the target PUCCH resource belongs, and the fourth MAC CE includes second target information. The second target information in the third MAC CE and the fourth MAC CE is used for determining the PUCCH resource group to which the target PUCCH resource belongs.

The network device 1000 shown in FIG. 10 may be configured to implement the embodiment of the method for information configuration shown in FIG. 4. For related details, refer to the foregoing method embodiment.

Figure 13:
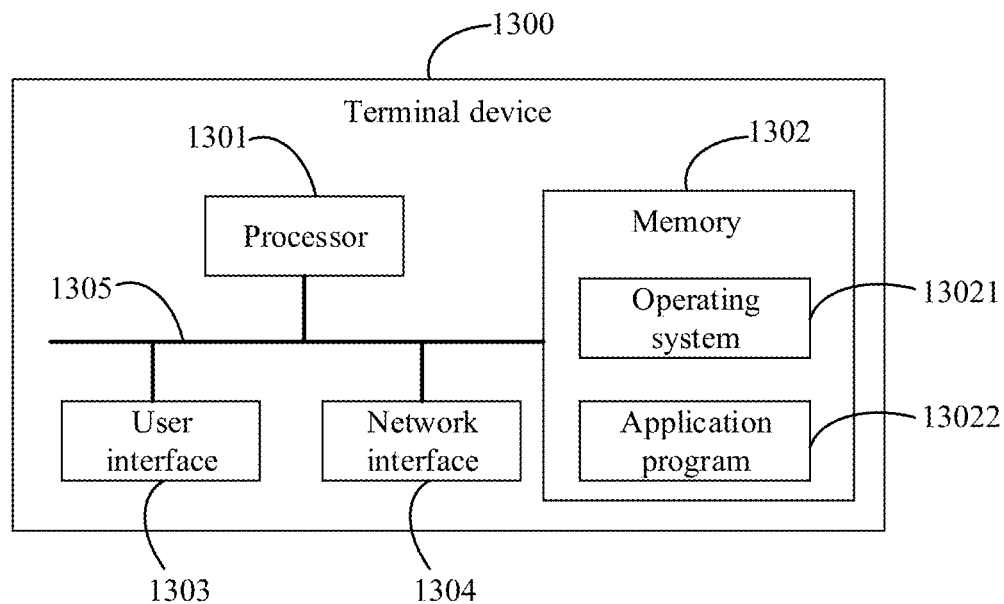
FIG. 13 is a schematic structural diagram of a terminal device according to an embodiment of this disclosure.

FIG. 13 is a schematic structural diagram of a terminal device according to another embodiment of this disclosure. The terminal device 1300 shown in FIG. 13 includes at least one processor 1301, a memory 1302, at least one network interface 1304, and a user interface 1303. The components of the terminal device 1300 are coupled together by using a bus system 1305. It can be understood that the bus system 1305 is configured to implement connection communication between these components. The bus system 1305 may include not only a data bus but also a power supply bus, a control bus, and a status signal bus. However, for clarity of description, various types of buses in FIG. 13 are marked as the bus system 1305.

The user interface 1303 may include a display, a keyboard, a click device (for example, a mouse or a trackball), a touch board, or a touchscreen.

It may be understood that the memory 1302 in this embodiment of this disclosure may be a volatile memory or a non-volatile memory, or may include both a volatile memory and a non-volatile memory. The non-volatile memory may be a read-only memory (ROM), a programmable read only memory (PROM), an erasable programmable read-only memory (EPROM), and an electrically erasable programmable read-only memory (EEPROM), or flash memory. The volatile memory may be a random access memory (RAM), which is used as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 1302 in the system and method described in the embodiments of this disclosure is intended to include but is not limited to these and any other suitable types of memories.

In some implementations, the memory 1302 stores the following elements: an executable module or a data structure, or a subset thereof, or an extended set thereof: an operating system 13021 and an application program 13022.

An operating system 13021 includes various system programs, such as a framework layer, a kernel library layer, and a driver layer, and is configured to implement various basic services and process hardware-based tasks. The application program 13022 includes various application programs, such as a media player, and a browser, and is configured to implement various application services. A program that implements the methods of the embodiments of this disclosure may be included in the application program 13022.

In this embodiment of this disclosure, the terminal device 1300 further includes: a computer program stored in the memory 1302 and capable of running on the processor 1301. When the computer program is executed by the processor 1301, the processes of the foregoing method for PUCCH transmission are implemented, with the same technical effects achieved. To avoid repetition, details are not described herein again.

The methods disclosed in the embodiments of this disclosure are applicable to the processor 1301, or implemented by the processor 1301. The processor 1301 may be an integrated circuit chip with a signal processing capability. In an implementation process, the steps in the foregoing method may be implemented by using a hardware integrated logic circuit in the processor 1301, or by using instructions in a form of software. The processor 1301 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1301 may implement or execute the methods, steps, and logical block diagrams disclosed in the embodiments of this disclosure. The general-purpose processor may be a microprocessor or any regular processor. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 1302, and the processor 1301 reads information in the memory 1302 and implements, in combination with its hardware, the steps of the foregoing methods. Specifically, a computer program is stored in the computer-readable storage medium, and when the computer program is executed by the processor 1301, the steps of the embodiments of the foregoing method for PUCCH transmission are implemented.

Figure 14:
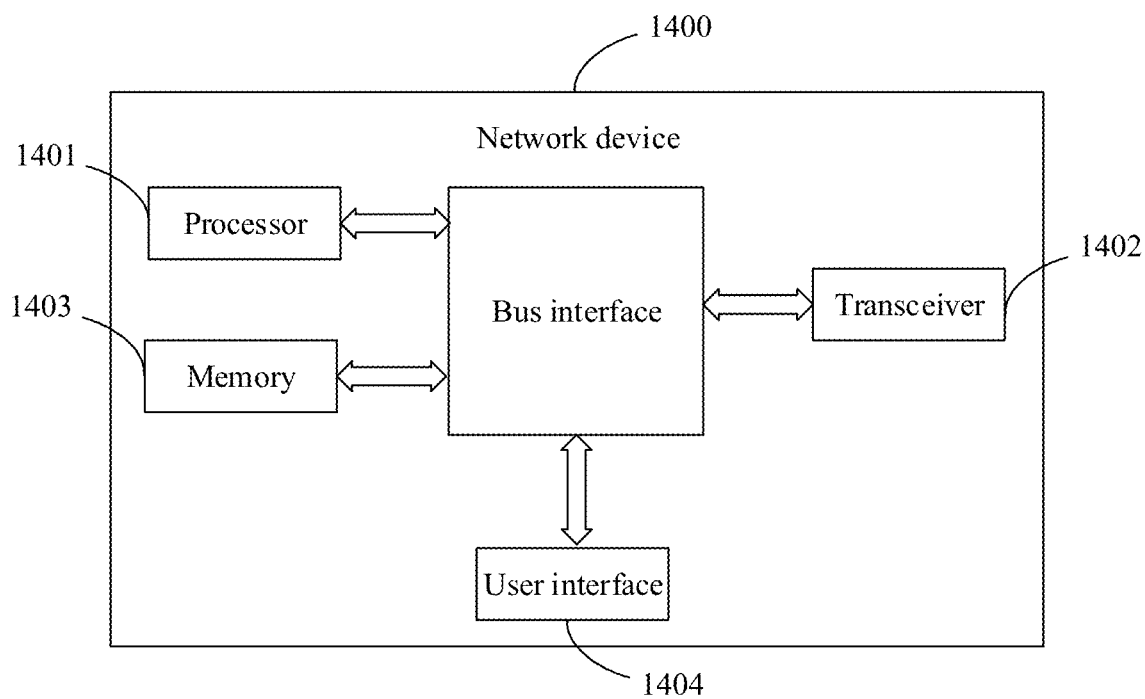
FIG. 14 is a schematic structural diagram of a network device according to an embodiment of this disclosure.

Referring to FIG. 14, FIG. 14 is a structural diagram of a network device to which the embodiments of this disclosure are applied. Details of the method for information configuration can be implemented to achieve the same effects. As shown in FIG. 14, the network device 1400 includes a processor 1401, a transceiver 1402, a memory 1403, a user interface 1404, and a bus interface.

In this embodiment of this disclosure, the network device 1400 further includes: a computer program stored in the memory 1403 and capable of running on the processor 1401. When the computer program is executed by the processor 1401, the processes of the foregoing method for information configuration are implemented, with the same technical effects achieved. To avoid repetition, details are not described herein again.

In FIG. 14, a bus architecture may include any quantity of interconnected buses and bridges, and specifically connects together circuits that are of at least one processor represented by the processor 1401 and of a memory represented by the memory 1403. The bus architecture may further interconnect various other circuits such as a peripheral device, a voltage regulator, and a power management circuit. These are all well known in the art, and therefore are not further described in this specification. The bus interface provides an interface. The transceiver 1402 may be a plurality of components, that is, the transceiver 1402 includes a transmitter and a receiver, and provides a unit for communicating with various other apparatuses on a transmission medium. For different terminal devices, the user interface 1404 may also be an interface that can be externally or internally connected to a required device. The connected device includes but is not limited to a keypad, a display, a speaker, a microphone, a joystick, and the like.

The processor 1401 is responsible for bus architecture management and general processing. The memory 1403 may store data used when the processor 1401 performs an operation.

It can be understood that the embodiments described in this disclosure may be implemented by hardware, software, firmware, middleware, microcode, or a combination thereof. For hardware implementation, the processing unit may be implemented in at least one ASIC, DSP, digital signal processing device (DSPD), programmable logic device (PLD), FPGA, general-purpose processor, controller, microcontroller, or microprocessor; or other electronic units for performing the functions described in this disclosure or a combination thereof.

For software implementation, the techniques described in the embodiments of this disclosure may be implemented by modules (such as processes and functions) that perform the functions described in the embodiments of this disclosure. Software code may be stored in the memory and executed by the processor. The memory may be implemented in or outside the processor.

An embodiment of this disclosure further provides a computer readable storage medium, where a computer program is stored in the computer readable storage medium. When the computer program is executed by a processor, the processes of the foregoing embodiments of the method for PUCCH transmission or the method for information configuration can be implemented. To avoid repetition, details are not described herein again. The computer-readable storage medium is, for example, a non-transitory computer-readable storage medium, for example, a ROM, a RAM, a magnetic disk, or an optical disc.

An embodiment of this disclosure further provides a computer program product including instructions. When a computer runs the instructions of the computer program product, the computer executes the method for PUCCH transmission or the method for information configuration. Specifically, the computer program product can be run on the foregoing network device.

A person of ordinary skill in the art may be aware that the units, modules, and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, module, and unit, reference may be made to a corresponding process in the foregoing method embodiments, and details are not described herein again. The flowcharts and block diagrams in the accompanying drawings illustrate the architecture, functions, and operations according to possible implementations of the systems, methods, and computer program products in various embodiments of this disclosure. In this regard, each block in the flowcharts or block diagrams may represent a module, segment, or part of code, and the module, segment, or part of code includes one or more executable instructions for implementing (one or more) specified logical functions.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses, modules, or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for physical uplink control channel (PUCCH) transmission, comprising:
   determining, by a terminal device, a target parameter used for sending a PUCCH on a target PUCCH resource, wherein the target PUCCH resource has at least two activation parameters, the target parameter is one of the at least two activation parameters, and each of the at least two activation parameters comprises at least one of activated spatial relation information and an activated power control parameter; and
   sending, by the terminal device, a PUCCH on the target PUCCH resource by using the target parameter,
   wherein before the determining, by the terminal device, a target parameter used for sending a PUCCH on a target PUCCH resource, the method further comprises:
   determining, by the terminal device, the at least two activation parameters of the target PUCCH resource based on first information from a network device,
   wherein the first information comprises a first medium access control control element (MAC CE).

2. The method according to claim 1, wherein
   the first information is used for determining the at least two activation parameters of the target PUCCH resource; or the first information is used for determining an activation parameter of at least one PUCCH resource group to which the target PUCCH resource belongs, wherein different PUCCH resource groups to which the target PUCCH resource belongs have different activation parameters.

3. The method according to claim 2, wherein before the determining, by the terminal device, the at least two activation parameters of the target PUCCH resource based on first information from a network device, the method further comprises:
   receiving, by the terminal device, second information from the network device, wherein the second information is used for configuring at least one parameter for the target PUCCH resource or the at least one PUCCH resource group, and the at least one parameter comprises one of the at least two activation parameters.

4. The method according to claim 1, wherein
   a first preset condition comprises one of the following conditions: first downlink control information (DCI) has been received by the terminal device from one transmission and reception point (TRP), wherein the first DCI is used to indicate that a PUCCH is to be transmitted on the target PUCCH resource; a plurality of pieces of DCI have been received by the terminal device from a plurality of TRPs, wherein the plurality of pieces of DCI are used to indicate that a PUCCH is to be transmitted on the target PUCCH resource; and a time point for sending a PUCCH by using the target PUCCH resource has arrived, wherein the target PUCCH resource is a periodic resource or a semi-persistent resource.

5. The method according to claim 4, wherein the determining, by the terminal device, a target parameter used for sending a PUCCH on a target PUCCH resource comprises:
   selecting, by the terminal device, one activation parameter from the at least two activation parameters as the target parameter used for sending a PUCCH on the target PUCCH resource.

6. The method according to claim 5, wherein the selecting, by the terminal device, one activation parameter from the at least two activation parameters as the target parameter used for sending a PUCCH on the target PUCCH resource comprises:
   in a case that PUCCH resources are not divided into groups, determining, by the terminal device, a first activation parameter of the at least two activation parameters as the target parameter used for sending a PUCCH on the target PUCCH resource; wherein
   the first activation parameter is one of the following activation parameters:
   an activation parameter in correspondence with a first specified TRP;
   an activation parameter in correspondence with a first specified object, wherein the first specified object comprises one of a specified resource, a specified channel, and a specified signal, and a value of a first preset parameter of the first specified object meets a second preset condition; and an activation parameter whose second preset parameter with a value meeting a third preset condition.

7. The method according to claim 6, wherein
the first activation parameter is an activation parameter in correspondence with the first specified TRP, wherein when the first preset condition comprises that first DCI has been received from one TRP, the first specified TRP is a TRP that sends the first DCI; when the first preset condition comprises that a plurality of pieces of DCI have been received from a plurality of TRPs, the first specified TRP is a TRP with a first preset identifier in the plurality of TRPs; and when the first preset condition comprises that a time point for sending a PUCCH by using the target PUCCH resource has arrived and that the target PUCCH resource is a periodic resource or a semi-persistent resource, the first specified TRP is a TRP corresponding to a most recent transmission from/to the terminal device, wherein the most recent transmission comprises one of any most recent transmission, any most recent downlink transmission, any most recent uplink transmission, a most recent specified channel transmission, and a most recent specified signal transmission; or
the first activation parameter is an activation parameter whose second preset parameter with a value meeting the third preset condition; wherein the second preset parameter comprises a reference signal, and the value of the second preset parameter comprises at least one of a type and an index value of the reference signal; or the second preset parameter comprises a source reference signal, and the value of the second preset parameter comprises at least one of a type and an index value of the source reference signal; or
the first activation parameter is an activation parameter in correspondence with the first specified object, wherein when the first preset condition comprises that first DCI has been received from one TRP, the first specified object is a control resource set group in which the first DCI is located; when the first preset condition comprises that a plurality of pieces of DCI have been received from a plurality of TRPs, the first specified object is a control resource set group whose group identifier meets the second preset condition in a plurality of control resource set groups in which the plurality of pieces of DCI are located; and when the first preset condition comprises that a time point for sending a PUCCH by using the target PUCCH resource has arrived and that the target PUCCH resource is a periodic resource or a semi-persistent resource, the first specified object is a control resource set group corresponding to a most recent transmission from/to the terminal device, and the most recent transmission comprises one of any most recent transmission, any most recent downlink transmission, any most recent uplink transmission, a most recent specified channel transmission, and a most recent specified signal transmission.

8. The method according to claim 5, wherein the selecting, by the terminal device, one activation parameter from the at least two activation parameters as the target parameter used for sending a PUCCH on the target PUCCH resource comprises:
in a case that PUCCH resources are divided into groups, determining, by the terminal device, a second activation parameter of the at least two activation parameters as the target parameter used for sending a PUCCH on the target PUCCH resource; wherein the second activation parameter is an activation parameter of a specified PUCCH resource group, and the specified PUCCH resource group comprises the target PUCCH resource.

9. The method according to claim 8, wherein
the specified PUCCH resource group is one of the following PUCCH resource groups:
a PUCCH resource group whose group identifier meets a fourth preset condition;
a PUCCH resource group in correspondence with a second specified TRP; and
PUCCH resource group in correspondence with a second specified object, wherein the specified object comprises one of a specified resource, a specified channel, and a specified signal, and a value of a third preset parameter of the second specified object meets a fifth preset condition.

10. The method according to claim 9, wherein
the specified PUCCH resource group is a PUCCH resource group whose group identifier meets the fourth preset condition; wherein the fourth preset condition comprises at least one of a group identifier being the largest, a group identifier being the smallest, and a group identifier being a preset value; or
the specified PUCCH resource group is a PUCCH resource group in correspondence with the second specified TRP, wherein when the first preset condition comprises that first DCI has been received from one TRP, the second specified TRP is a TRP that sends the first DCI; when the first preset condition comprises that a plurality of pieces of DCI have been received from a plurality of TRPs, the second specified TRP is a TRP with a second preset identifier in the plurality of TRPs; when the first preset condition comprises that a time point for sending a PUCCH by using the target PUCCH resource has arrived and that the target PUCCH resource is a periodic resource or a semi-persistent resource, the second specified TRP is a TRP corresponding to a most recent transmission from/to the terminal device, and the most recent transmission comprises one of any most recent transmission, any most recent downlink transmission, any most recent uplink transmission, a most recent specified channel transmission, and a most recent specified signal transmission; or
the specified PUCCH resource group is a PUCCH resource group in correspondence with the second specified object, wherein when the first preset condition comprises that first DCI has been received from one TRP, the second specified object is a control resource set group in which the first DCI is located; when the first preset condition comprises that a plurality of pieces of DCI have been received from a plurality of TRPs, the second specified object is a control resource set group whose group identifier meets the fifth preset condition in a plurality of control resource set groups in which the plurality of pieces of DCI are located; and when the first preset condition comprises that a time point for sending a PUCCH by using the target PUCCH resource has arrived and that the target PUCCH resource is a periodic resource or a semi-persistent resource, the second specified object is a control resource set group corresponding to a most recent transmission from/to the terminal device, and the most recent transmission comprises one of any most recent transmission, any most recent downlink transmission, any most recent uplink transmission, a most recent specified channel transmission, and a most recent specified signal transmission.

11. The method according to claim 5, wherein the selecting, by the terminal device, one activation parameter from the at least two activation parameters as the target parameter used for sending a PUCCH on the target PUCCH resource comprises:
based on third information from the network device, selecting, by the terminal device, one activation parameter from the at least two activation parameters as the target parameter used for sending a PUCCH on the target PUCCH resource.

12. The method according to claim 4, wherein
the first preset condition comprises that a time point for sending a PUCCH by using the target PUCCH resource has arrived and that the target PUCCH resource is a periodic resource or a semi-persistent resource, and the determining, by the terminal device, a target parameter used for sending a PUCCH on a target PUCCH resource comprises:
based on a periodicity of the target PUCCH resource, selecting, by the terminal device, one of the at least two activation parameters in turn as the target parameter used for sending a PUCCH on the target PUCCH resource.

13. The method according to claim 4, wherein the sending, by the terminal device, a PUCCH on the target PUCCH resource by using the target parameter comprises:
sending, by the terminal device, the PUCCH to a target TRP on the target PUCCH resource by using the target parameter;
wherein
when the first preset condition comprises that first DCI has been received from one TRP, the target TRP is a TRP that sends the first DCI;
when the first preset condition comprises that a plurality of pieces of DCI have been received from a plurality of TRPs, the target TRP is one TRP corresponding to the target parameter in the plurality of TRPs;
when the first preset condition comprises that a time point for sending a PUCCH by using the target PUCCH resource has arrived and that the target PUCCH resource is a periodic resource or a semi-persistent resource, the target TRP is a TRP corresponding to a most recent transmission, and the most recent transmission comprises one of any most recent transmission, any most recent downlink transmission, any most recent uplink transmission, a most recent specified channel transmission, and a most recent specified signal transmission.

14. A terminal device, wherein the terminal device comprises a memory, a processor, and a wireless communication program stored in the memory and running on the processor, wherein when the wireless communication program is executed by the processor, following steps are implemented:
determining a target parameter used for sending a PUCCH on a target PUCCH resource, wherein the target PUCCH resource has at least two activation parameters, the target parameter is one of the at least two activation parameters, and each of the at least two activation parameters comprises at least one of activated spatial relation information and an activated power control parameter; and
sending a PUCCH on the target PUCCH resource by using the target parameter,
wherein when the wireless communication program is executed by the processor, a following step is further implemented: before determining a target parameter used for sending a PUCCH on a target PUCCH resource,
determining the at least two activation parameters of the target PUCCH resource based on first information from a network device,
wherein the first information comprises a first MAC CE.

15. The terminal device according to claim 14, wherein the first information is used for determining the at least two activation parameters of the target PUCCH resource; or the first information is used for determining an activation parameter of at least one PUCCH resource group to which the target PUCCH resource belongs, wherein different PUCCH resource groups to which the target PUCCH resource belongs have different activation parameters.

16. The terminal device according to claim 15, wherein when the wireless communication program is executed by the processor, a following step is further implemented: before determining the at least two activation parameters of the target PUCCH resource based on first information from a network device,
receiving second information from the network device, wherein the second information is used for configuring at least one parameter for the target PUCCH resource or the at least one PUCCH resource group, and the at least one parameter comprises one of the at least two activation parameters.

17. The terminal device according to claim 14, wherein a first preset condition comprises one of the following conditions: first DCI has been received by the terminal device from one TRP, wherein the first DCI is used to indicate that a PUCCH is to be transmitted on the target PUCCH resource; a plurality of pieces of DCI have been received by the terminal device from a plurality of TRPs, wherein the plurality of pieces of DCI are used to indicate that a PUCCH is to be transmitted on the target PUCCH resource; and a time point for sending a PUCCH by using the target PUCCH resource has arrived, wherein the target PUCCH resource is a periodic resource or a semi-persistent resource.

18. A network device, comprising a memory, a processor, and a wireless communication program stored in the memory and running on the processor, wherein when the wireless communication program is executed by the processor, a following step is implemented:
sending first information to a terminal device; wherein the first information is used for the terminal device to determine at least two activation parameters of a target PUCCH resource; each of the at least two activation parameters comprises at least one of activated spatial relation information and an activated power control parameter,
wherein the first information comprises a first MAC CE; the first MAC CE is used by the terminal device to determine the at least two activation parameters of the target PUCCH resource before the terminal device determines a target parameter used for sending a PUCCH on the target PUCCH resource.

* * * * *